US008221919B2

(12) United States Patent
Shimoda et al.

(10) Patent No.: US 8,221,919 B2
(45) Date of Patent: *Jul. 17, 2012

(54) PROCESS FOR FORMING CATALYST LAYER, AND PROCESS FOR PRODUCING MEMBRANE/ELECTRODE ASSEMBLY FOR POLYMER ELECTROLYTE FUEL CELL

(75) Inventors: Hiroshi Shimoda, Chiyodu-ku (JP); Shinji Kinoshita, Chiyoda-ku (JP); Toshihiro Tanuma, Chiyoda-ku (JP); Seigo Kotera, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 429 days.

This patent is subject to a terminal disclaimer.

(21) Appl. No.: 12/481,261

(22) Filed: Jun. 9, 2009

(65) Prior Publication Data

US 2010/0043954 A1 Feb. 25, 2010

Related U.S. Application Data

(60) Provisional application No. 61/116,372, filed on Nov. 20, 2008.

(30) Foreign Application Priority Data

Jun. 10, 2008 (JP) ................................. 2008-152132

(51) Int. Cl.
*H01M 4/80* (2006.01)
*H01M 8/10* (2006.01)
*H01M 4/02* (2006.01)

(52) U.S. Cl. ......................... 429/237; 429/523; 429/481

(58) Field of Classification Search .................. None
See application file for complete search history.

(56) References Cited

U.S. PATENT DOCUMENTS

| 5,547,551 | A | 8/1996 | Bahar et al. |
| 6,042,958 | A | 3/2000 | Denton et al. |
| 6,641,862 | B1* | 11/2003 | Grot ................ 427/115 |
| 6,880,328 | B2* | 4/2005 | Daetz et al. ............ 60/285 |
| 2002/0144394 | A1* | 10/2002 | Uchida et al. .......... 29/623.5 |
| 2006/0040045 | A1* | 2/2006 | Limmer et al. .......... 427/115 |
| 2007/0264551 | A1* | 11/2007 | Matsunaga ............ 429/29 |
| 2009/0169950 | A1* | 7/2009 | Prugh et al. ............ 429/30 |

FOREIGN PATENT DOCUMENTS

| JP | 10-312815 | 11/1998 |
| JP | 2006-252967 | 9/2006 |

* cited by examiner

*Primary Examiner* — Melvin C Mayes
*Assistant Examiner* — Sheng H Davis
(74) *Attorney, Agent, or Firm* — Oblon, Spivak, McClelland, Maier & Neustadt, L.L.P.

(57) ABSTRACT

In the production of a membrane/electrode assembly 10, a first catalyst layer 22 (a second catalyst layer 34) is formed by a process comprising steps (a) and (b). (a) A step of applying a coating fluid comprising a catalyst and an ion-exchange resin, on a substrate to form a coating fluid layer. (b) A step of disposing a reinforcing layer 24 (34) on the coating fluid layer formed in the step (a) and then, drying the coating fluid layer to form a first catalyst layer 22 (a second catalyst layer 34) The process provides a catalyst layer whereby defects such as cracks are scarcely formed in the catalyst layer, and the bond strength is high at the interface between the catalyst layer and a reinforcing layer and at the interface between the catalyst layer and a polymer electrolyte membrane.

19 Claims, 13 Drawing Sheets

PROCESS FOR FORMING CATALYST LAYER, AND PROCESS FOR PRODUCING MEMBRANE/ELECTRODE ASSEMBLY FOR POLYMER ELECTROLYTE FUEL CELL

BACKGROUND OF THE INVENTION

1. Field of the Invention

The present invention relates to a process for forming a catalyst layer in an electrode for a polymer electrolyte fuel cell, and a process for producing a membrane/electrode assembly for a polymer electrolyte fuel cell.

2. Discussion of Background

Fuel cells are expected to be widely used in future, since they have high power generation efficiency, and the reaction product is only water in principle whereby the load to the environment is low. Among them, a polymer electrolyte fuel cell has a high output power density and is expected to be widely used for automobiles or as a distributed power generation system, a transportable power generation system or a household cogeneration system.

A polymer electrolyte fuel cell is usually constituted by a cell wherein an electrically conductive separator having gas flow paths formed, is disposed on each side of a membrane/electrode assembly comprising a cathode having a catalyst layer and a gas diffusion layer, an anode having a catalyst layer and a gas diffusion layer and a polymer electrolyte membrane disposed between the catalyst layer of the cathode and the catalyst layer of the anode.

In a case where the membrane/electrode assembly is poor in the dimensional stability or mechanical strength, the handling efficiency is likely to be poor at the time of assembling the cell, or the polymer electrolyte membrane is likely to break during the operation. Therefore, the membrane/electrode assembly is required to have sufficient mechanical strength and dimensional stability.

Further, recently, the polymer electrolyte fuel cell is required to be operated under a low humidity condition where the relative humidity of the reaction gas (fuel gas and oxidant gas) is low, in order to simplify the fuel cell system or to reduce the cost. If the power generation can be conducted stably under a low humidity condition, it will be unnecessary to provide a peripheral device such as a humidifying device, whereby it will be possible to reduce the size or cost of the fuel cell system. Accordingly, the polymer electrolyte membrane for the membrane/electrode assembly is required to have a high ion-exchange capacity (i.e. the equivalent weight (grams of the polymer per one equivalent of ionic groups, hereinafter referred to as EW) being small) and a thin thickness (at most 25 μm) in order to maintain the ion conductivity even under a low humidity condition.

However, the polymer electrolyte membrane has such a nature that as EW is small, it undergoes substantial swelling or shrinkage due to a change of the humidity environment. Such swelling or shrinkage occurs due to a change in the operation conditions such as the cell temperature, the relative humidity of the reaction gas, the amount of the reaction gas, the output power, etc. Accordingly, in a practical application, due to repetition of such swelling and shrinkage, the polymer electrolyte membrane is likely to undergo a dimensional change irregularly, and as a result, the polymer electrolyte membrane will get wrinkles. And, in a case where the thickness of the polymer electrolyte membrane is thin, the polymer electrolyte membrane may break due to such wrinkles.

As a polymer electrolyte membrane and a membrane/electrode assembly having the dimensional stability improved, the following ones have, for example, been proposed.

(1) A thin composite membrane (polymer electrolyte membrane) having a thickness of at most about 25 μm, having an ion-exchange resin impregnated to a stretch-expanded tetrafluoroethylene membrane having a fine porous structure (Patent Document 1).

(2) A composite membrane (polymer electrolyte membrane) having an ion-conductive polymer impregnated in a porous body of individual fibers which are randomly oriented (Patent Document 2).

(3) A membrane/electrode assembly having a reinforcing material containing electrically conductive nano fibers disposed on at least one side of a polymer electrolyte membrane (Patent Document 3).

However, the composite membrane (1) has a problem such that the ion-conductivity tends to be low as compared with a membrane not reinforced, and especially, the power generation performance is likely to be low under a low humidity condition.

Also the composite membrane (2) has a problem that when a porous body having sufficient chemical stability and mass-producibility is selected, the ion-conductivity tends to be low as compared with a membrane not reinforced, and especially, the power generation performance tends to be low under a low humidity condition.

With the membrane/electrode assembly (3), the dimensional stability and mechanical strength are still inadequate, and especially when the thickness of the polymer electrolyte membrane is at most 25 μm, it is not durable against the above-mentioned repetition of swelling and shrinkage. That is, in a case where a reinforcing material is to be provided on the outside of the polymer electrolyte membrane as in the membrane/electrode assembly (3), in order to increase the dimensional stability of the polymer electrolyte membrane, it is required to increase the bond strength between the reinforcing material and the layer adjacent thereto thereby to adequately reinforce the polymer electrolyte membrane by the reinforcing material.

As another problem of the membrane/electrode assembly, there is a problem that defects such as cracks are likely to form in the catalyst layer during the production of the membrane/electrode assembly. That is, the catalyst layer is formed by applying a coating fluid containing a catalyst and an ion-exchange resin on a substrate such as a release film, followed by drying, and cracks, etc. are likely to form in the catalyst layer due to shrinkage, etc. of the ion-exchange resin containing a solvent, or evaporation of the solvent during the drying. Further, the catalyst layer is brittle, and defects such as falling of the catalyst layer, transfer failure, etc. are likely to result due to cracking or the like of the catalyst layer at the time of the transfer to the polymer electrolyte membrane.

Patent Document 1: U.S. Pat. No. 5,547,551
Patent Document 2: JP-A-10-312815
Patent Document 3: JP-A-2006-252967

SUMMARY OF THE INVENTION

The present invention provides a process for producing a catalyst layer in an electrode for a polymer electrolyte fuel cell having the catalyst layer and a reinforcing layer, whereby defects such as cracks are scarcely formed in the catalyst layer, and the bond strength at the interface between the catalyst layer and the reinforcing layer is high, and when a polymer electrolyte membrane is provided in contact with the catalyst layer, the bond strength at the interface of the catalyst layer and the polymer electrolyte membrane is also high; and a process for producing a membrane/electrode assembly for a polymer electrolyte fuel cell which is capable of exhibiting high power generation performance even under a low humidity condition and has sufficient mechanical strength and dimensional stability and which has excellent durability even in an environment where humidification and drying, etc. are repeated.

The process for forming a catalyst layer of the present invention is a process for forming a catalyst layer in an electrode for a polymer electrolyte fuel cell having the catalyst layer containing a catalyst and an ion-exchange resin, and a reinforcing layer containing a porous sheet-form reinforcing material made of a polymer and electrically conductive fibers, which comprises the following steps (a) and (b):

(a) a step of applying a coating fluid comprising a catalyst and an ion-exchange resin, on a substrate to form a coating fluid layer, and (b) a step of disposing a reinforcing layer on the coating fluid layer formed in the step (a) and then drying the coating fluid layer to form a catalyst layer.

The process for producing a membrane/electrode assembly for a polymer electrolyte fuel cell of the present invention, is a process for producing a membrane/electrode assembly for a polymer electrolyte fuel cell, comprising a first electrode having a first catalyst layer, a second electrode having a second catalyst layer and a polymer electrolyte membrane interposed between the first and second catalyst layers, wherein at least the first electrode further has a reinforcing layer containing a porous sheet-form reinforcing material made of a polymer and electrically conductive fibers, which comprises the following steps (a') to (d'):

(a') a step of applying a coating fluid comprising a catalyst and an ion-exchange resin, on a release film to form a coating fluid layer, (b') a step of disposing a reinforcing layer on the coating fluid layer formed in the step (a') and then drying the coating fluid layer to form a first catalyst layer, (c') a step of removing the release film from the first catalyst layer formed in the step (b') to obtain a first laminate comprising the first catalyst layer and the reinforcing layer, and (d') a step of bonding the first laminate obtained in the step (c') with a polymer electrolyte membrane so that the first catalyst layer of the first laminate is in contact with the polymer electrolyte membrane.

Further, the process for producing a membrane/electrode assembly for a polymer electrolyte fuel cell of the present invention is a process for producing a membrane/electrode assembly for a polymer electrolyte fuel cell, comprising a first electrode having a first catalyst layer, a second electrode having a second catalyst layer and a polymer electrolyte membrane interposed between the first and second catalyst layers, wherein at least the second electrode further has a reinforcing layer containing a porous sheet-form reinforcing material made of a polymer and electrically conductive fibers, which comprises the following steps (a") to (c"):

(a") a step of applying a coating fluid comprising a catalyst and an ion-exchange resin, on a polymer electrolyte membrane formed on a release film, to form a coating fluid layer, (b") a step of disposing a reinforcing layer on the coating fluid layer formed in the step (a") and then drying the coating fluid layer to form a second catalyst layer, (c") a step of removing the release film from the polymer electrolyte membrane after the step (b") to obtain a second laminate comprising the polymer electrolyte membrane, the second catalyst layer and the reinforcing layer.

The process comprising the steps (a") to (c") preferably further has the following steps (a') to (c') and (d"):

(a') a step of applying a coating fluid comprising a catalyst and an ion-exchange resin, on a release film to form a coating fluid layer, (b') a step of disposing a reinforcing layer on the coating fluid layer formed in the step (a') and then drying the coating fluid layer to form a first catalyst layer, (c') a step of removing the release film from the first catalyst layer formed in the step (b') to obtain a first laminate comprising the first catalyst layer and the reinforcing layer, and (d") a step of bonding the first laminate obtained in the step (c') with the second laminate obtained in the step (c") so that the first catalyst layer of the first laminate is in contact with the polymer electrolyte membrane of the second laminate.

The process for producing a membrane/electrode assembly for a polymer electrolyte fuel cell is a process for producing a membrane/electrode assembly for a polymer electrolyte fuel cell, comprising a first electrode having a first catalyst layer, a second electrode having a second catalyst layer and a polymer electrolyte membrane interposed between the first and second catalyst layers, wherein each of the first electrode and the second electrode further has a reinforcing layer containing a porous sheet-form reinforcing material made of a polymer and electrically conductive fibers, which comprises the following steps (h) to (j), (h') to (j') and (k):

(h) a step of applying a coating fluid comprising a catalyst and an ion-exchange resin, on a first ion-exchange resin membrane formed on a release film, to form a coating fluid layer, (i) a step of disposing a reinforcing layer on the coating fluid layer formed in the step (h) and then drying the coating fluid layer to form a first catalyst layer, (j) a step of removing the release film from the first ion-exchange membrane after the step (i) to obtain a third laminate comprising the first ion-exchange resin membrane, the first catalyst layer and the reinforcing layer, (h') a step of applying a coating fluid comprising a catalyst and an ion-exchange resin, on a second ion-exchange resin membrane formed on a release film, to form a coating fluid layer, (I') a step of disposing a reinforcing layer on the coating fluid layer formed in the step (h') and then drying the coating fluid layer to form a second catalyst layer, (j') a step of removing the release film from the second ion-exchange membrane after the step (I') to obtain a fourth laminate comprising the second ion-exchange resin membrane, the second catalyst layer and the reinforcing layer, and (k) a step of bonding the third laminate obtained in the step (j) with the fourth laminate obtained in the step (j') so that the first ion-exchange resin membrane of the third laminate is in contact with the second ion-exchange resin membrane of the fourth laminate thereby to form a polymer electrolyte membrane comprising the first ion-exchange resin membrane and the second ion-exchange resin membrane.

EFFECTS OF THE INVENTION

According to the process for producing a catalyst layer of the present invention, defects such as cracks are scarcely formed in the catalyst layer, the bond strength at the interface between the catalyst layer and the reinforcing layer is high, and when a polymer electrolyte membrane is provided in contact with the catalyst layer, the bond strength at the interface between the catalyst layer and the polymer electrolyte membrane is also high.

According to the process for producing a membrane/electrode assembly for a polymer electrolyte fuel cell of the present invention, it is possible to produce a membrane/electrode assembly for a polymer electrolyte fuel cell which is capable of exhibiting high power generation performance even under a low humidity condition and has sufficient mechanical strength and dimensional stability and which has excellent durability even in an environment where humidification and drying, etc. are repeated.

MEANINGS OF SYMBOLS

Figure 1:
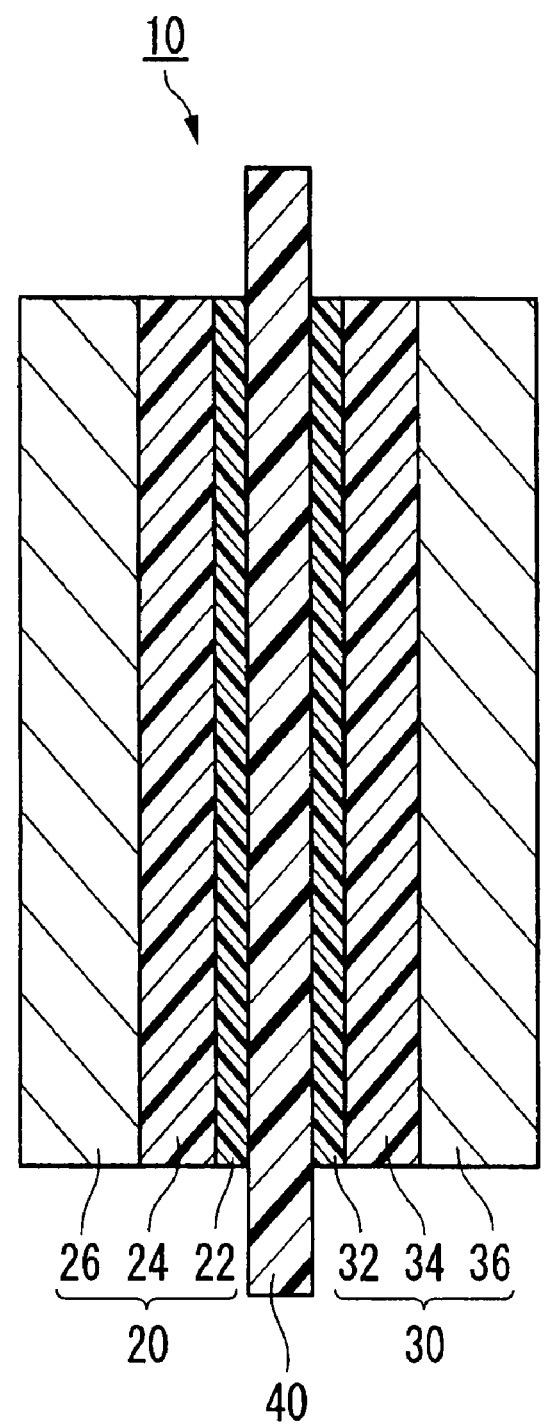
FIG. 1 is a cross sectional view illustrating an embodiment of the membrane/electrode assembly.

10: Membrane/electrode assembly
20: First electrode
22: First catalyst layer
24: Reinforcing layer
26: Gas diffusion layer
30: Second electrode
32: Second catalyst layer
34: Reinforcing layer
36: Gas diffusion layer
40: Polymer electrolyte membrane
50: Release film
60: Coating fluid layer
70: First laminate
72: First' laminate
80: Subgasket
90: Second laminate
92: Third laminate
94: Fourth laminate
100: Fifth laminate
102: First ion-exchange resin membrane
104: Second ion-exchange resin membrane
110: Current collector
112: Potentiostat
114: Insulating plate
116: Press plate

BEST MODE FOR CARRYING OUT THE INVENTION

In the present specification, repeating units represented by the formula (1) will be referred to as units (1). Repeating units represented by other formulae will also be referred to in the same manner. The repeating units are meant for units derived from a monomer, formed by polymerization of such a monomer. The repeating units may be units formed directly by a polymerization reaction or units having some of such units converted to another structure by treatment of the polymer.

Further, in this specification, a compound represented by the formula (2) will be referred to as a compound (2). Compounds represented by other formulae will also be referred to in the same manner.

Membrane/Electrode Assembly

The membrane/electrode assembly for a polymer electrolyte fuel cell obtained by the process of the present invention (hereinafter referred to as the membrane/electrode assembly) is characterized in that at least one of the cathode and the anode has a reinforcing layer, and the polymer electrolyte membrane is reinforced from its outside by this reinforcing layer, whereby while sufficiently suppressing the dimensional change of the polymer electrolyte membrane, it is possible to improve the power generation characteristics by suppressing an increase of resistance as compared with the case of reinforcing the polymer electrolyte membrane from its inside. Especially, it is possible to increase the power generation characteristics under a low humidity condition.

FIG. 1 is a cross sectional view illustrating an embodiment of the membrane/electrode assembly. The membrane/electrode assembly 10 comprises a first electrode 20 having a first catalyst layer 22, a reinforcing layer 24 and a gas diffusion layer 26 sequentially; a second electrode 30 having a second catalyst layer 32, a reinforcing layer 34 and a gas diffusion layer 36 sequentially; and a polymer electrode membrane 40 disposed between the first catalyst layer 22 of the first electrode 20 and the second catalyst layer 32 of the second electrode 30.

The first electrode 20 may be an anode or a cathode. The second electrode 30 is a cathode when the first electrode 20 is an anode, and an anode when the first electrode 20 is a cathode.

Catalyst Layer

The first catalyst layer 22 and the second catalyst layer 32 (which may be hereinafter generally referred to also as a catalyst layer) are layers containing a catalyst and an ion-exchange resin. The first catalyst layer 22 and the second catalyst layer 32 may be layers wherein the components, composition, thickness, etc. are the same, or layers wherein the components, composition, thickness, etc. are different.

The catalyst may be any catalyst so long as it is one to accelerate an oxidation-reduction reaction in a fuel cell. A catalyst containing platinum is preferred. Particularly preferred is a supported catalyst having platinum or a platinum alloy supported on a carbon carrier.

The carbon carrier may, for example, be activated carbon or carbon black. One graphitized by heat treatment or the like is preferred from such a viewpoint that the chemical durability is high.

The specific surface area of the carbon carrier is preferably at least 200 m²/g. The specific surface area of the carbon carrier is measured by nitrogen adsorption on the carbon surface by a BET specific surface area-measuring device.

The platinum alloy is preferably an alloy of platinum with at least one metal selected from the group consisting of platinum group metals other than platinum (ruthenium, rhodium, palladium, osmium and iridium), gold, silver, chromium, iron, titanium, manganese, cobalt, nickel, molybdenum, tungsten, aluminum, silicon, zinc and tin. Such a platinum alloy may contain an intermetallic compound of platinum with a metal which can be alloyed with platinum.

The amount of platinum or a platinum alloy to be supported is preferably from 10 to 70 mass %, based on the supported catalyst (100 mass %).

From the viewpoint of the durability, the ion-exchange resin is preferably a fluorinated ion-exchange resin, and more preferred is a perfluorocarbon polymer having ionic groups (which may contain an etheric oxygen atom). As such a perfluorocarbon polymer, polymer (H) or polymer (Q) is preferred, and particularly preferred is polymer (Q).

Polymer (H):

Polymer (H) is a copolymer having units based on tetrafluoroethylene (hereinafter referred to as TFE) and units (1).

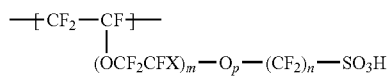  (1)

wherein X is a fluorine atom or a trifluoromethyl group, m is an integer of from 0 to 3, n is an integer of from 1 to 12, and p is 0 or 1.

Polymer (H) is obtained by polymerizing a mixture of TFE and a compound (2) to obtain a precursor polymer (hereinafter referred to as polymer (F)), and then converting —SO$_2$F groups in the polymer (F) to sulfonic acid groups. The conversion of —SO$_2$F groups to sulfonic acid groups is carried out by hydrolysis and treatment for conversion to acid form.

$$CF_2=CF(OCF_2CFX)_m-O_p-(CF_2)_n-SO_2F \quad (2)$$

wherein X is a fluorine atom or a trifluoromethyl group, m is an integer of from 0 to 3, n is an integer of from 1 to 12, and p is 0 or 1.

As the compound (2), compounds (2-1) to (2-3) are preferred.

$$CF_2=CFO(CF_2)_{n1}SO_2F \quad (2\text{-}1)$$

$$CF_2=CFOCF_2CF(CF_3)O(CF_2)_{n2}SO_2F \quad (2\text{-}2)$$

$$CF_2=CF(OCF_2CF(CF_3))_{m3}O(CF_2)_{n3}SO_2F \quad (2\text{-}3)$$

wherein each of n1, n2 and n3 is an integer of from 1 to 8, and m3 is an integer of from 1 to 3.

Polymer (Q):

Polymer (Q) is a copolymer having units (U1) and units (U2).

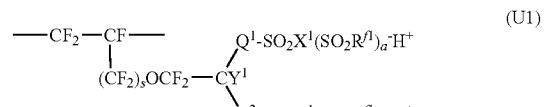  (U1)

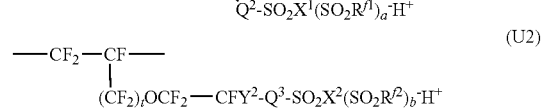  (U2)

wherein Q$^1$ is a perfluoroalkylene group which may have an etheric oxygen atom, Q$^2$ is a single bond, or a perfluoroalkylene group which may have an etheric oxygen atom, R$^{f1}$ is a perfluoroalkyl group which may have an etheric oxygen atom, X$^1$ is an oxygen atom, a nitrogen atom or a carbon atom, a is 0 when X$^1$ is an oxygen atom, 1 when X$^1$ is a nitrogen atom, or 2 when X$^1$ is a carbon atom, Y$^1$ is a fluorine atom or a monovalent perfluoroorganic group, s is 0 or 1, Q$^3$ is a single bond or a perfluoroalkylene group which may have an etheric oxygen atom, R$^{f2}$ is a perfluoroalkylene group which may have an etheric oxygen atom, X$^2$ is an oxygen atom, a nitrogen atom or a carbon atom, b is 0 when X$^2$ is an oxygen atom, 1 when X$^2$ is a nitrogen atom, or 2 when X$^2$ is a carbon atom, Y$^2$ is a fluorine atom or a monovalent perfluoroorganic group, and t is 0 or 1.

The single bond means direct bonding of the carbon atom of CY$^1$ or CY$^2$, to the sulfur atom of SO$_2$.

The organic group means a group containing at least one carbon atom.

Units (U1):

In a case where the perfluoroalkylene group as Q$^1$ or Q$^2$ has an etheric oxygen atom, such an oxygen atom may be one or more. Further, such an oxygen atom may be inserted between a carbon atom-carbon bond in a perfluoroalkylene group, or may be inserted at a carbon atom bond terminal.

The perfluoroalkylene group may be linear or branched, preferably linear.

The number of carbon atoms in the perfluoroalkylene group is preferably from 1 to 6, more preferably from 1 to 4. When the number of carbon atoms is at most 6, the boiling point of the raw material fluorinated monomer will be low, whereby purification by distillation will be easy. Further, when the number of carbon atoms is at most 6, an increase of EW of the polymer (Q) can be suppressed, whereby a decrease in the proton conductivity will be suppressed.

Q$^2$ is preferably a C$_{1-6}$ perfluoroalkyl group which may have an etheric oxygen atom. When Q$^2$ is a C$_{1-6}$ perfluoroalkyl group having an etheric oxygen atom, the stability of the power generation performance will be excellent when the polymer electrolyte cell is operated for a long period of time, as compared with the case where Q$^2$ is a single bond.

At least one of Q$^1$ and Q$^2$ is preferably a C$_{1-6}$ perfluoroalkyl group having an etheric oxygen atom. A fluorinated monomer having a C$_{1-6}$ perfluoroalkylene group having an etheric oxygen atom can be prepared without requiring a fluorination reaction by fluorine gas, whereby the yield is good and the production is easy.

The perfluoroalkyl group as R$^{f1}$ may be linear or branched, preferably linear. The number of carbon atoms in the perfluoroalkyl group is preferably from 1 to 6, more preferably from 1 to 4. The perfluoroalkyl group is preferably, for example, a perfluoromethyl group or a perfluoroethyl group. When a unit (U1) has two or more R$^{f1}$, the plurality of R$^{f1}$ may be the same or different.

The —(SO$_2$X$^1$(SO$_2$R$^{f1}$)$_a$)$^-$H$^+$ group is an ionic group.

As the $-(SO_2X^1(SO_2R^{f1})_a)^-H^+$ group, a sulfonic acid group ($-SO_3^-H^+$ group), a sulfonimide group ($-SO_2N(SO_2R^{f1})^-H^+$ group), or a sulfonemethide group ($-SO_2C(SO_2R^{f1})_2)^-H^+$ group) may be mentioned.

$Y^1$ is preferably a fluorine atom or a $C_{1-6}$ linear perfluoroalkyl group which may have an etheric oxygen atom.

The unit (U1) is preferably a unit (M1) and more preferably a unit (M11), a unit (M12) or a unit (M13) from such a viewpoint that the production of polymer (Q) is thereby easy, and the industrial application is easy.

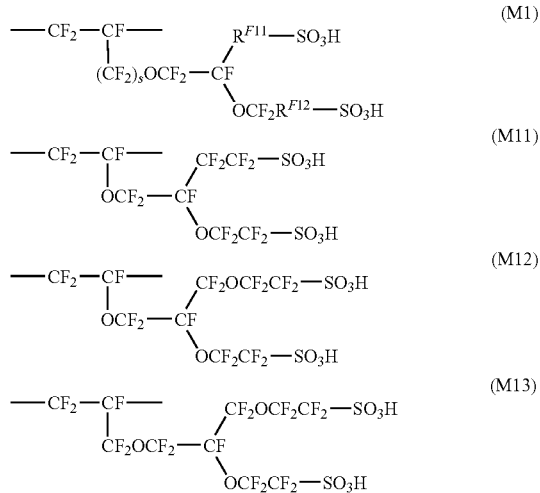

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

Units (U2):

When the perfluoroalkylene group as $Q^3$ has an etheric oxygen atom, such an oxygen atom may be one or more. Further, such an oxygen atom may be inserted between a carbon atom-carbon atom bond of a perfluoroalkylene group or may be inserted at a carbon atom bond terminal.

The perfluoroalkylene group may be linear or branched. The number of carbon atoms in the perfluoroalkylene group is preferably from 1 to 6, more preferably from 1 to 4. When the number of carbon atoms is at most 6, an increase of EW of the polymer (Q) can be suppressed, and a decrease in the proton conductivity can be suppressed.

The perfluoroalkyl group as $R^{f2}$ may be linear or branched, and is preferably linear.

The number of carbon atoms in the perfluoroalkyl group is preferably from 1 to 6, more preferably from 1 to 4. The perfluoroalkyl group may, for example, preferably be a perfluoromethyl group or a perfluoroethyl group.

The $-(SO_2X^2(SO_2R^{f2})_b)^-H^+$ group is an ionic group.

The $-(SO_2X^2(SO_2R^{f2})_b)^-H^+$ group may, for example, be a sulfonic acid group ($-SO_3^-H^+$ group), a sulfonimide group ($-SO_2N(SO_2R^{f2})^-H^+$ group) or a sulfonemethide group ($-SO_2C(SO_2R^{f2})_2)^-H^+$ group).

$Y^2$ is preferably a fluorine atom or a trifluoromethyl group.

The unit (U2) is preferably a unit (M2) and more preferably a unit (M21), a unit (M22), a unit (M23) or a unit (M24) from such a viewpoint that the production of polymer (Q) is thereby easy, and the industrial application is easy.

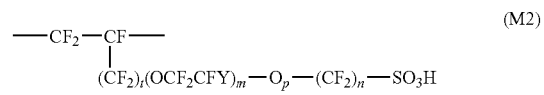
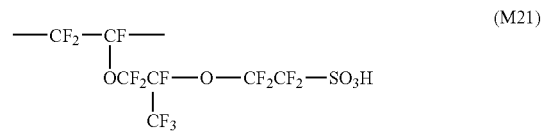
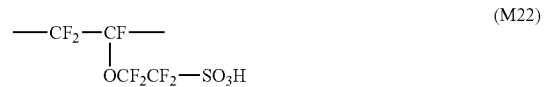
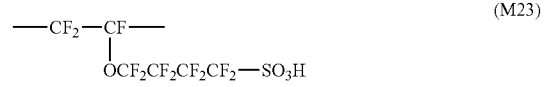
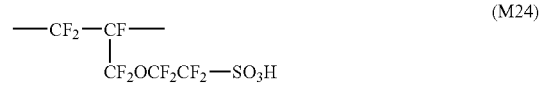

wherein Y is a fluorine atom or a trifluoromethyl group, m is an integer of from 0 to 3, n is an integer of from 1 to 12, p is 0 or 1, and m+p>0.

Other Units:

The polymer (Q) may further contain repeating units based on the after-mentioned other monomers (hereinafter referred to as other units). The proportion of other units may suitably be adjusted so that EW of the polymer (Q) will be within the after-mentioned preferred range.

From the viewpoint of mechanical strength and chemical durability, other units are preferably repeating units based on a perfluoromonomer, more preferably repeating units based on TFE.

The proportion of repeating units based on TFE is preferably at least 20 mol %, more preferably at least 40 mol %, among all repeating units (100 mol %) constituting the polymer (Q), from the viewpoint of the mechanical strength and chemical durability.

The proportion of repeating units based on TFE is preferably at most 92 mol %, more preferably at most 87 mol %, among all repeating units (100 mol %) constituting the polymer (Q), from the viewpoint of the electrical resistance.

The polymer (Q) may have one type of each of units (U1), units (U2) and other units or may have two or more types of each of them.

The polymer (Q) is preferably a perfluoropolymer from the viewpoint of the chemical durability.

EW of the polymer (Q) is preferably from 400 to 900 g dry resin/equivalent (hereinafter referred to as g/equivalent), more preferably from 500 to 800 g/equivalent, further preferably from 550 to 780 g/equivalent, particularly preferably from 580 to 750 g/equivalent. When EW is at most 900 g/equivalent, the proton conductivity will be high (the electrical resistance will be low), whereby a sufficient cell output can be obtained. When EW is at least 400 g/equivalent, preparation of a polymer having a high molecular weight will be easy, and the polymer (Q) will not excessively swell with water, whereby the mechanical strength can be maintained.

EW of polymers which have been commonly used heretofore is at a level of from 900 to 1,100 g/equivalent from the balance of the electrical resistance and the mechanical strength. On the other hand, with the polymer (Q), the mechanical strength can be maintained even when EW is made small to lower the electrical resistance.

The proportion of units (U2) in the polymer (Q) is preferably from 0.2 to 0.7, more preferably from 0.25 to 0.6, further preferably from 0.3 to 0.55 (molar ratio), as represented by units (U2)/(units (U1)+units (U2)). When the proportion of units (U2) is at least 0.2, the durability against repetition of swelling and drying will be high, whereby the polymer electrolyte fuel cell can be operated stably over a long period of time. When the proportion of units (U2) is at most 0.7, the mechanical strength can be maintained without bringing the water content to be too high or without bringing the softening temperature and the glass transition temperature to be too low.

The mass average molecular weight of the polymer (Q) is preferably from $1\times10^4$ to $1\times10^7$, more preferably from $5\times10^4$ to $5\times10^6$, further preferably from $1\times10^5$ to $3\times10^6$. When the mass average molecular weight of the polymer (Q) is at least $1\times10^4$, the physical properties such as the degree of swelling, etc., tend to scarcely change with time, and the durability will be sufficient. When the mass average molecular weight of the polymer (Q) is at most $1\times10^7$, the solubilization and molding will be easy.

The mass average molecular weight of the polymer (Q) can be evaluated by measuring the TQ value. The TQ value (unit: ° C.) is an index for the molecular weight of the polymer and is a temperature at which the amount of extrusion becomes 100 mm$^3$/sec, when the polymer is subjected to melt-extrusion under an extrusion pressure condition of 2.94 MPa using a nozzle having a length of 1 mm and an inner diameter of 1 mm. For example, a polymer having a TQ value of from 200 to 300° C. corresponds to a mass average molecular weight of from $1\times10^5$ to $1\times10^6$, although it may vary depending upon the composition of repeating units constituting the polymer.

Process for Producing Polymer (Q):

Polymer (Q) may be produced, for example, via the following steps.

(i) A step of polymerizing a compound (u1), a compound (u2) and, as the case requires, other monomers, to obtain a precursor polymer (hereinafter referred to as a polymer (P)) having —SO$_2$F groups:

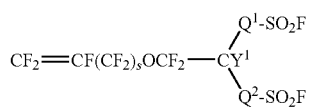
(u1)

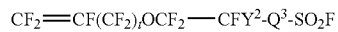
(u2)

(ii) A step of contacting the polymer (P) with fluorine gas, as the case requires, to fluorinate an unstable terminal group of the polymer (P).

(iii) A step of converting —SO$_2$F groups of the polymer (P), to sulfonic acid groups, sulfonimide groups or sulfonemethide groups, to obtain the polymer (Q).

Step (i):

The compound (u1) is preferably a compound (m1), more preferably a compound (m11), a compound (m12) or a compound (m13).

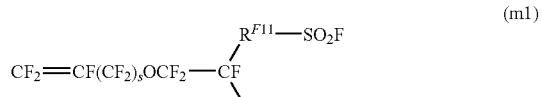
(m1)

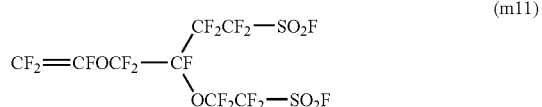
(m11)

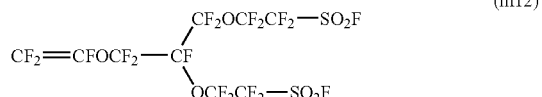
(m12)

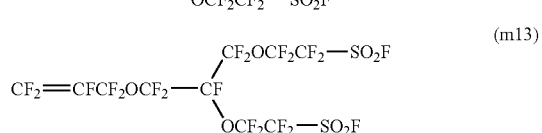
(m13)

The compound (m1) may be produced, for example, by the following preparation route.

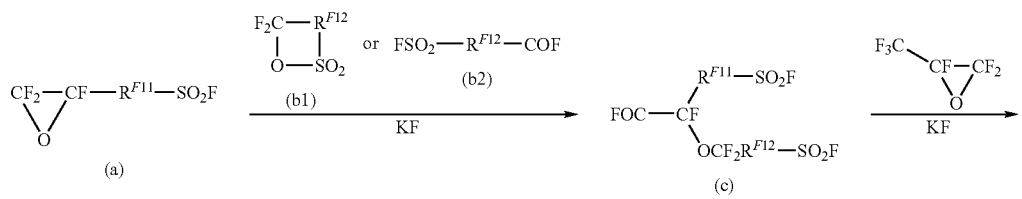

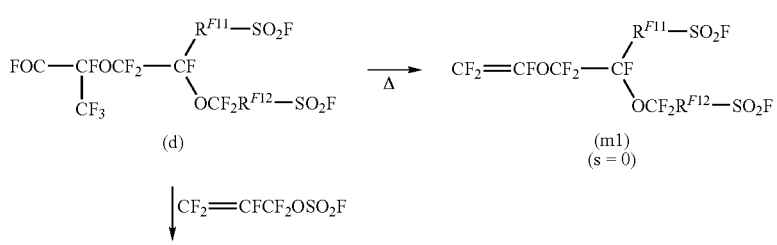

-continued

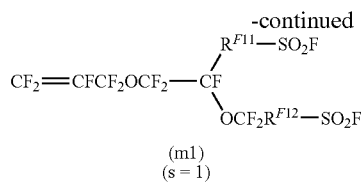

(m1)
(s = 1)

The compound (u2) is preferably a compound (m2), more preferably a compound (m21), a compound (m22), a compound (m23) or a compound (m24).

$$CF_2=CF(CF_2)_l(OCF_2CFY)_m-O_p-(CF_2)_n-SO_2F \quad (m2)$$

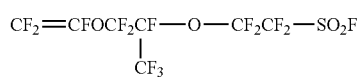
(m21)

$$CF_2=CFOCF_2CF_2-SO_2F \quad (m22)$$

$$CF_2=CFOCF_2CF_2CF_2CF_2-SO_2F \quad (m23)$$

$$CF_2=CFCF_2OCF_2CF_2-SO_2F \quad (m24)$$

The compound (u2) may be produced by a known preparation method such as a method disclosed in "Du Pont Innovation", vol. 43, No. 3, 1973, p. 10, edited by D. J. Vaugham, or a method disclosed in Examples in U.S. Pat. No. 4,358,412.

Other monomers may, for example, be TFE, chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluorovinyl ether (such as a perfluoro(alkyl vinyl ether) or a perfluoro(etheric oxygen atom-containing alkyl vinyl ether).

The perfluorovinyl ether is preferably a compound (m3), more preferably a compound (m31), a compound (m32) or a compound (m33).

$$CF_2=CF-(OCF_2CFZ)_u-O-R^f \quad (m3)$$

$$CF_2=CF-O-(CF_2)_vCF_3 \quad (m31)$$

$$CF_2=CF-OCF_2CF(CF_3)-O-(CF_2)_wCF_3 \quad (m32)$$

$$CF_2=CF-(OCF_2CF(CF_3))_x-O-(CF_2)_2CF_3 \quad (m33)$$

wherein Z is a fluorine atom or a trifluoromethyl group, $R^f$ is a linear or branched $C_{1-12}$ perfluoroalkyl group, u is an integer of from 0 to 3, v is an integer of from 1 to 9, w is an integer of from 1 to 9, and x is 2 or 3. Among other monomers, a perfluoromonomer is preferred, and TFE is more preferred, from the viewpoint of the mechanical strength and chemical durability.

As the polymerization method, a known polymerization method may be mentioned such as a bulk polymerization method, a solution polymerization method, a suspension polymerization method or an emulsion polymerization method. Otherwise, polymerization may be carried out in liquid or supercritical carbon dioxide.

The polymerization is carried out under a condition to form radicals. The method to form radicals may, for example, be a method of applying a radiation such as ultraviolet rays, γ-rays, electron beams, or a method of adding a radical initiator.

The polymerization temperature is usually from 10 to 150° C.

The radical initiator may, for example, be a bis(fluoroacyl) peroxide, a bis(chlorofluoroacyl) peroxide, a dialkyl peroxy dicarbonate, a diacyl peroxide, a peroxy ester, an azo compound or a persulfate, and a perfluoro compound such as bis(fluoroacyl) peroxide is preferred from such a viewpoint that the polymer F substantially free from unstable terminal groups is thereby obtainable.

A solvent to be used for the solution polymerization method is preferably a solvent having a boiling point of from 20 to 350° C., more preferably a solvent having a boiling point of from 40 to 150° C. Such a solvent may, for example, be a perfluorotrialkylamine (such as perfluorotributylamine), a perfluorocarbon (such as perfluorohexane or perfluorooctane), a hydrofluorocarbon (such as 1H,4H-perfluorobutane or 1H-perfluorohexane), or a hydrochlorofluorocarbon (such as 3,3-dichloro-1,1,1,2,2-pentafluoropropane or 1,3-dichloro-1,1,2,2,3-pentafluoropropane).

In the solution polymerization method, a monomer, a radical initiator, etc. are added to a solvent, and radicals are formed in the solvent to carry out polymerization of the monomer. The addition of the monomer may be all at once, sequentially or continuously.

In the suspension polymerization method, water is used as a dispersion medium, and in the dispersion medium, a monomer, a non-ionic radical initiator, etc. are added to let radicals form in the dispersion medium thereby to carry out polymerization of the monomer.

The non-ionic radical initiator may, for example, be a bis (fluoroacyl) peroxide, a bis(chlorofluoroacyl) peroxide, a dialkylperoxy dicarbonate, a diacyl peroxide, a peroxy ester, a dialkyl peroxide, a bis(fluoroalkyl) peroxide or an azo compound.

To the dispersion medium, the above-mentioned solvent; a surfactant as a dispersion stabilizer to prevent agglomeration of suspended particles; a hydrocarbon compound (such as hexane or methanol) as a molecular-controlling agent, etc., may be added as assisting agents.

Step (ii):

The unstable terminal group is a group formed by a chain transfer reaction, a group based on the radical initiator or the like. Specifically, it may, for example, be a —COOH group, a —CF=CF_2 group, a —COF group or a —CF_2H group. The unstable terminal group is fluorinated or stabilized, whereby decomposition of the polymer (Q) will be prevented, and the durability will be improved.

The fluorine gas may be used as diluted with an inert gas such as nitrogen, helium or carbon dioxide, or may be used as it is without being diluted.

The temperature at the time of contacting the polymer (P) with fluorine gas is preferably from room temperature to 300° C., more preferably from 50 to 250° C., further preferably from 100 to 220° C., particularly preferably from 150 to 200° C.

The contact time of the polymer (P) with fluorine gas is preferably from one minute to one week, more preferably from 1 to 50 hours.

Step (iii):

For example, in a case where —$SO_2F$ groups are converted to sulfonic acid groups, a step (iii-1) is carried out, and in a case where —$SO_2F$ groups are converted to sulfonimide groups, a step (iii-2) is carried out.

(iii-1) A step of hydrolyzing —$SO_2F$ groups in the polymer (P) to a sulfonic acid salt and then converting the sulfonic acid salt to acid-form to obtain sulfonic acid groups.

(iii-2) A step of imidizing —$SO_2F$ groups in the polymer (P) to salt-form sulfonimide groups (—$SO_2NMSO_2R^{f1}$ groups) (wherein M is an alkali metal or primary to quaternary ammonium), followed by conversion to acid-form to form acid-form sulfonimide groups (—$SO_2NHSO_2R^{f1}$ groups).

Step (iii-1):

The hydrolysis is carried out, for example, by contacting the polymer (P) with a basic compound in a solvent.

The basic compound may, for example, be sodium hydroxide or potassium hydroxide. The solvent may, for example, be water or a mixed solvent of water with a polar solvent. The polar solvent may, for example, be an alcohol (such as methanol or ethanol) or dimethylsulfoxide.

The conversion to acid-form may be carried out, for example, by contacting the polymer having a sulfonic acid salt with an aqueous solution of hydrochloric acid, sulfuric acid or the like.

The hydrolysis and conversion to acid-form are carried out usually at a temperature of from 0 to 120° C.

Step (iii-2):

As the imidation, the following methods may, for example, be mentioned.

(iii-2-1) A method of reacting —$SO_2F$ groups with $R^{f1}SO_2NHM$.

(iii-2-2) A method of reacting —$SO_2F$ groups with $R^{f1}SO_2NH_2$ in the presence of an alkali metal hydroxide, an alkali metal carbonate, MF, ammonia or a primary to tertiary amine.

(iii-2-3) A method of reacting —$SO_2F$ groups with $R^{f1}SO_2NMSi(CH_3)_3$.

The conversion to acid-form is carried out by treating the polymer having salt-form sulfonimide groups with an acid (such as sulfuric acid, nitric acid or hydrochloric acid).

Further, the polymer (Q) wherein ionic groups are sulfonimide groups may also be produced by polymerizing a compound (u1') having —$SO_2F$ groups in the compound (u1) converted to sulfonimide groups, a compound (u2') having a —$SO_2F$ group in the compound (u2) converted to a sulfonimide group, and, as the case requires, other monomers.

The compound (u1') or (u2') may be produced by adding chlorine or bromine to the unsaturated bond in the compound (u1) or (u2), and converting a —$SO_2F$ group to a sulfonimide group in the same manner as in the step (iii-2), followed by a dechlorination or debromination reaction by means of metallic zinc.

The polymer (Q) as described above, has units (U1) and units (U2), whereby the electrical resistance is low, the softening point is higher than a conventional ion-exchange resin, and the flexibility is high. The reason is as follows.

The side chain of the unit (U1) has two ionic groups, and the mobility of the side chain is low as compared with the unit (U2) having one ionic group in its side chain. Therefore, as compared with a polymer having the unit (U2) and not having the unit (U1), the softening point of the polymer (Q) having both the unit (U1) and the unit (U2) is considered to be high.

Further, the side chain of the unit (U2) has an effect to increase the flexibility of the main chain of the polymer, and as compared with a polymer having the unit (U1) and not having the unit (U2), the polymer (Q) having both the unit (U1) and the unit (U2) is considered to have high flexibility.

The mass ratio (F/C) of the mass (F) of the fluorinated ion-exchange resin to the mass (C) of carbon in the catalyst, in the catalyst layer, is preferably from 0.2 to 2.5, more preferably from 0.7 to 2.0, from the viewpoint of the water repellency and the electrical conductivity of the electrode. When F/C is at least 0.2, the catalyst layer tends to be hardly breakable. When F/C is at most 2.5, the catalyst layer will not be a dense structure, whereby the gas diffusion property will be good.

The catalyst layer may be made of a single layer or a plurality of layers. In the case of a plurality of layers, it is preferred that F/C of each layer becomes gradually large as it becomes close to the polymer electrolyte membrane 40.

The amount of platinum contained in the catalyst layer is preferably from 0.01 to 0.5 mg/cm$^2$ from the viewpoint of the optimum thickness to carry out the electrode reaction efficiently, more preferably from 0.05 to 0.35 mg/cm$^2$ from the viewpoint of the raw material cost and the performance.

The thickness of the catalyst layer is preferably at most 20 μm, more preferably from 1 to 15 μm, with a view to facilitating the gas diffusion in the catalyst layer and improving the power generation performance of the polymer electrolyte fuel cell. Further, the thickness of the catalyst layer is preferably uniform. When the thickness of the catalyst layer is made thin, the amount of the catalyst present per unit area decreases, and the reaction activity tends to be low. In such a case, if a supported catalyst having platinum or a platinum alloy supported at a high supported ratio is used as a catalyst, it is possible to maintain the reaction activity of the electrode to be high without deficiency of the catalyst amount even when the thickness is thin.

The thickness of the catalyst layer may be measured by observing the cross section of the catalyst layer by e.g. SEM (scanning electron microscope).

The catalyst layer may contain a water-repellent agent with a view to increasing the effect to suppress flooding.

The water-repellent agent may, for example, be a TFE/hexafluoropropylene copolymer (hereinafter referred to as FEP), a TFE/perfluoro(alkyl vinyl ether) copolymer (hereinafter referred to as PFA) or a polytetrafluoroethylene (hereinafter referred to as PTFE). The water-repellent agent is preferably a fluorinated polymer dispersible in a solvent, from such a viewpoint that the water repellent treatment of the catalyst layer is easy.

The amount of the water-repellent agent is preferably from 0.01 to 30 mass % in the catalyst layer (100 mass %).

Reinforcing Layer

A reinforcing layer 24 and a reinforcing layer 34 (which may be hereinafter generally referred to also as a reinforcing layer) are layers comprising a porous sheet-form reinforcing material made of a polymer, electrically conductive fibers, and, as the case requires, a binder. The reinforcing layer 24 and the reinforcing layer 34 may be layers wherein the components, composition, thickness, etc. are the same or different.

In the reinforcing layer, a porous sheet-form reinforcing material made of a polymer is disposed inside, whereby the mechanical strength is high, and at the same time, electrically conductive fibers are packed with spaces in the inside of the porous sheet-form reinforcing material, and electrically conductive fibers are present also at the surface of the sheet-form reinforcing material, whereby it has electrical conductivity and gas diffusion efficiency. It is preferred that the electrically conductive fibers are present in at least 1% of the surface area of the reinforcing layer, and this may be an interlayer which will be described hereinafter.

The polymer constituting such a sheet-form reinforcing material may, for example, be polypropylene, polyethylene, polyphenylene sulfide, nylon, polyamide, PTFE, PFA, an ethylene/TFE copolymer (hereinafter referred to as ETFE), FEP, polychlorotrifluoroethylene (PCTFE), an ethylene/chlorotrifluoroethylene copolymer (ECTFE), a polyvinylidene fluoride polymer (hereinafter referred to as PVdF), a polyvinyl fluoride polymer (PVF), a copolymer made of a plurality of monomer units constituting such polymers, or a blend of these polymers. Further, a blend of such polymers, etc. may have electrical conductivity.

The sheet-form reinforcing material may be in the form of woven fabric, non-woven fabric, a foamed product or a porous film.

As the porous film, a porous film made of PTFE is preferred. The porous film made of PTFE is produced by stretching a PTFE film. Such a production method is excellent in the mass productivity and production cost, and a thin film of at most 100 μm can be produced.

As the non-woven fabric, a non-woven fabric produced by a melt blown method or an electrospinning method is preferred. By a melt blown method, it is possible to produce a non-woven fabric with a fine fiber having a fiber diameter of at most about 10 μm, and the mass productivity is also excellent. The polymer to be used for such a melt blown method may, for example, be polypropylene or a fluorinated polymer (such as ETFE or FEP), preferably a fluorinated polymer. By the electrospinning method, it is possible to produce a non-woven fabric with a fine fiber having a fiber diameter of at most about 1 μm, and the mass productivity is excellent. The polymer to be used for the electrospinning method may, for example, be polyamide, PVdF or nylon.

With respect to a sheet-form reinforcing material made of a plurality of fibers, the average fiber diameter is preferably from 0.2 to 7 μm, more preferably from 0.3 to 5 μm. By adjusting the average fiber diameter within such a range, it is possible to maintain the sufficient reinforcing effect, gas diffusion property and water discharge property.

The average fiber diameter of the sheet-form reinforcing material can be measured by observing the surface by e.g. SEM.

With respect to a sheet-form reinforcing material, such as a porous sheet prepared by a stretching method and not constituted by fibers, the average pore diameter is preferably from 0.4 to 7 μm, more preferably from 0.8 to 5 μm. By adjusting the average pore diameter to be within such a range, it is possible to maintain the sufficient reinforcing effect, gas diffusion property and water-discharge property.

The average pore diameter of the sheet-form reinforcing material may be measured by a bubble point method (JIS K3832).

The thickness of the sheet-form reinforcing material is preferably from 5 to 300 μm, more preferably from 10 to 80 μm. By adjusting the thickness to be within such a range, it is possible to maintain the sufficient reinforcing effect, gas diffusion property and water discharge property.

With respect to the thickness of the sheet-form reinforcing material, thicknesses at four portions are measured by means of a digimatic indicator (543-250, manufactured by Mitutoyo Corporation, flat measuring terminal: 5 mm in diameter), and the thickness is calculated by averaging the measured values.

The electrically conductive fibers get entangled with the electron-conductive material (platinum or a platinum alloy, a carbon carrier, etc.) contained in the catalyst layer at the surface of the reinforcing layer, to provide new electrically conductive paths in addition to the electrically conductive paths by point contact of the electron-conductive materials one another, whereby the electron conductivity at the interface with the catalyst layer will be improved. Further, also in a case where they are in contact with the gas diffusion layer, entanglement with the electron-conductive material constituting the gas diffusion layer is likely to occur, whereby the electron conductivity at the interface with the gas diffusion layer will be improved.

The electrically conductive fibers may, for example, be carbon fibers, and ones graphitized by heat treatment or the like are preferred from such a viewpoint that the chemical durability is high.

The carbon fibers are preferably carbon nanofibers from such a viewpoint that they are fine, and their electron conductivity is high. The carbon nanofibers may, for example, be gas-phase grown carbon fibers, or carbon nanotubes (single wall, double wall, multiwall, cup lamination type, etc.).

The average fiber diameter of the carbon fibers is preferably from 50 to 500 nm, more preferably from 50 to 300 nm. The average fiber length of the carbon fibers is preferably from 1 to 50 μm, more preferably from 5 to 30 μm. Within such ranges, the carbon fibers are likely to be entangled one another to form spaces, whereby the porous spaces will not be embedded, and the high gas diffusion property can be maintained.

The fiber diameter and the fiber length of carbon fibers are measured by observation by means of e.g. an optical microscope, SEM or TEM (transmission electron microscope). The fiber diameter and fiber length of the carbon nanofibers represent the average fiber diameter and average fiber length of the carbon nanofibers, respectively.

The binder is a component to suppress detachment of conductive fibers from the sheet-form reinforcing material. The binder is preferably a polymer, more preferably an ion-exchange resin, further preferably a fluorinated ion-exchange resin. The fluorinated ion-exchange resin is preferably a perfluorocarbon polymer (which may contain an etheric oxygen atom) having ionic groups, particularly preferably polymer (H) or polymer (Q).

The mass ratio of the electrically conductive fibers to the binder (the electrically conductive fibers/binder) is preferably from 1/0.05 to 1/1, more preferably from 1/0.1 to 1/0.7. Within such a range, the dispersibility when the electrically conductive fibers are packed in the interior of the porous sheet-form reinforcing material, the gas diffusion property of the reinforcing layer, the bonding property of the sheet-form reinforcing material with the electrically conductive fibers, and the water-discharge property, will be good.

The thickness of the reinforcing layer is preferably from 12 to 250 μm, more preferably from 20 to 100 μm. Within such a range, it is possible to maintain the sufficient reinforcing effect, gas diffusion property and water-discharge property.

The thickness of the reinforcing layer is measured by observing the cross section of the reinforcing layer by e.g. SEM.

Further, the membrane/electrode assembly of the present invention is not limited to one illustrated in the drawings. For example, it may be a membrane/electrode assembly wherein one of the first electrode 20 and the second electrode 30 may have the reinforcing layer, and the other has no reinforcing layer. From the viewpoint of the dimensional stability, it is preferred to provide the reinforcing layer to each of the first electrode 20 and the second electrode 30.

Further, in a case where the sheet-form reinforcing material is thin, there may be a case where a surface layer containing electrically conductive fibers and a binder and containing no sheet-form reinforcing material, is formed in the vicinity of the surface of the reinforcing layer. Such a surface layer may be formed on the side which is in contact with the catalyst layer or on the side which is in contact with the gas diffusion layer.

By the formation of the surface layer, water may swiftly move from the catalyst layer to the reinforcing layer, and from the reinforcing layer to the gas diffusion layer, by a capillary phenomenon, whereby a problem of flooding at the time of the operation of the polymer electrolyte fuel cell tends to be easily solved.

The thickness of the surface layer is preferably from 1 to 20 μm. Within such a range, the adhesion between the catalyst layer and the reinforcing layer, and the adhesion between the reinforcing layer and the gas diffusion layer, will be good, and the contact resistance at such an interface can be made to be adequately small.

The thickness of the surface layer is measured by observing the cross section of the surface layer by e.g. SEM.

The surface layer may be formed on each of the reinforcing layer 24 and the reinforcing layer 34, or may be formed on one of the reinforcing layer 24 and the reinforcing layer 34. In a case where one of the reinforcing layer 24 and the reinforcing layer 34 has a surface layer, and the other has no surface layer, it is preferred that the reinforcing layer on the cathode side has the surface layer.

Gas Diffusion Layer

A gas diffusion layer 26 and a gas diffusion layer 36 (which may be hereinafter generally referred to also as a gas diffusion layer) may, for example, be gas diffusing substrates such as carbon papers, carbon cloths or carbon felts.

In the membrane/electrode assembly, when a gas diffusion layer is provided, it is possible to prevent by the reinforcing layer a physical damage such that fibers, etc. constituting the gas diffusion layer will penetrate into the polymer electrolyte membrane. It is thereby possible to prevent short-circuiting of the membrane/electrode assembly thereby to improve the durability of the membrane/electrode assembly.

Further, by the presence of the reinforcing layer between the catalyst layer and the gas diffusion layer, it is possible to prevent a physical damage to each of the catalyst layer and the polymer electrolyte membrane by fibers, etc. constituting the gas diffusion layer, whereby it is possible to further prevent short circuiting of the membrane/electrode assembly thereby to further improve the durability of the membrane/electrode assembly.

It is preferred that the surface of the gas diffusion layer is treated for water repellency by a solution or dispersion containing a water-repellent fluorinated polymer. By such water-repellent treatment, water generated at the catalyst layer on the cathode side is prevented from clogging pores in the gas diffusion layer, whereby deterioration of the gas diffusion property can be suppressed.

The surface of the gas diffusion layer is more preferably treated for water repellency by a dispersion containing a water-repellent fluorinated polymer and electrically conductive carbon from the viewpoint of the electrical conductivity of the membrane/electrode assembly.

The water-repellent fluorinated polymer may, for example, be PTFE. The electrically conductive carbon may, for example, be carbon black.

The surface treated for water repellency of the gas diffusion layer is in contact with the catalyst layer or the reinforcing layer.

The thickness of the gas diffusion layer is preferably from 100 to 400 μm, more preferably from 120 to 300 μm.

With respect to the thickness of the gas diffusion layer, the thicknesses at four portions are measured by means of a digimatic indicator (543-250, manufactured by Mitutoyo Corporation, flat measuring terminal: 5 mm in diameter), and the thickness is calculated by averaging the measured values.

Polymer Electrolyte Membrane

A polymer electrolyte membrane 40 is a membrane of an ion-exchange resin.

The ion-exchange resin is preferably a fluorinated ion-exchange resin, more preferably a perfluorocarbon polymer having ionic groups (which may have an etheric oxygen atom), further preferably polymer (H) or polymer (Q), particularly preferably polymer (Q), from the viewpoint of the durability. A membrane of polymer (Q) has a softening temperature higher than the membrane of a conventional ion-exchange resin and has high flexibility, whereby the electrical resistance is low, and it has higher heat resistance than the membrane of a conventional ion-exchange resin and is hardly breakable even when swelling in a humidified state and shrinkage in a dried state are repeated.

The polymer electrolyte membrane 40 may contain at least one type of atoms selected from the group consisting of cerium and manganese in order to further improve the durability. Cerium and manganese will decompose hydrogen peroxide which is a substance to cause deterioration of the polymer electrolyte membrane 40. Such cerium or manganese is preferably present in the form of ions in the polymer electrolyte membrane 40, and if it is present in the form of ions, it may be present in any state in the polymer electrolyte membrane 40.

The polymer electrolyte membrane 40 may contain silica or a hetero polyacid (such as zirconium phosphate, phosphorus molybdic acid or phosphorus tungstic acid) as a water retention agent to prevent drying.

The thickness of the polymer electrolyte membrane 40 is preferably from 10 to 30 μm, more preferably from 15 to 25 μm. When the thickness of the polymer electrolyte membrane 40 is at most 30 μm, it is possible to better prevent deterioration of the power generation performance of the polymer electrolyte fuel cell under a low humidity condition. Further, by adjusting the thickness of the polymer electrolyte membrane 40 to be at least 10 μm, it is possible to prevent electrical short-circuiting or gas leakage.

The thickness of the polymer electrolyte membrane 40 is measured by observing the cross section of the polymer electrolyte membrane 40 by e.g. SEM.

EW of the polymer electrolyte membrane 40 is preferably at most 900 g/equivalent, particularly preferably at most 700 g/equivalent. Within such a range, it is possible to obtain a sufficient cell output, since the proton conductivity becomes high (the electrical resistance becomes low) even in a low humidity environment.

EW of the polymer electrolyte membrane 40 is obtained by the following method.

Two types of polymers, of which EW is preliminarily known by titration (one having EW of 1,000 g/equivalent and one having EW of 909 g/equivalent), are prepared, and with respect to two types of membranes (thickness: 200 μm) made of the respective polymers, the peak intensity based on a sulfur atom is measured by means of a fluorescent X-ray (RIX3000, manufactured by Rigaku Corporation), whereupon a calibration curve showing the relation between the peak intensity and EW, is prepared. The polymer (P) or the polymer (F) is pressed at the after-mentioned TQ value temperature to prepare a membrane having a thickness of 200 μm, and its peak intensity based on the sulfur atom is measured by the fluorescent X-ray, and EW is obtained by the above calibration curve. The proportion (molar ratio) of —SO$_2$F groups in the polymer (P) or the polymer (F) is the same as the proportion (molar ratio) of —SO$_3$H groups in the polymer (Q) or the polymer (H). Accordingly, EW of the polymer (P) or the polymer (F) may be handled as it is as EW of the polymer (Q) or the polymer (H).

Otherwise, a polymer electrolyte membrane made of an ion-exchange resin membrane may be formed by bonding ion-exchange resin membranes so that they are in contact with each other.

Method for Forming Reinforcing Layer

A reinforcing layer may be formed, for example, by the following method.

A method wherein a sheet-form reinforcing material is disposed on the surface of a release film, and then, to the sheet-form reinforcing material, a dispersion comprising conductive fibers and, as the case requires, a binder (hereinafter referred to as an electrically conductive coating fluid) is applied, penetrated and dried to form a reinforcing layer.

The electrically conductive coating fluid is prepared by dispersing electrically conductive fibers in a solvent, and, as the case requires, a binder is dissolved or dispersed in the solvent.

The solvent is preferably a mixed solvent of water with an alcohol (such as ethanol) in a case where the binder is an ion-exchange resin.

The solid content concentration of the electrically conductive coating fluid is preferably from 5 to 30 mass %.

The release film may, for example, be a resin film. The material for the resin film may be the following resins, and from the viewpoint of the heat resistance, chemical stability and release properties, a fluorinated resin is preferred.

Non-fluorinated resins: Polyethylene terephthalate (PET), polyethylene, polypropylene, polyimide, etc.

Fluorinated resins: PTFE, ETFE, an ethylene/hexafluoropropylene copolymer, PFA, PVdF, etc.

As the coating method, a known method may be employed.

The drying temperature is preferably from 40 to 130° C.

Method for Forming Polymer Electrolyte Membrane

The polymer electrolyte membrane 40 may be formed, for example, by the following method.

A method wherein polymer (H) or polymer (Q) obtained in the above step (iii) is formed into a membrane-shape.

The method for forming polymer (H) or polymer (Q) into a membrane-shape may, for example, be a method (a casting method) wherein a liquid composition of polymer (H) or polymer (Q) is applied on a release film, followed by drying.

The liquid composition is a dispersion having polymer (H) or polymer (Q) dispersed in a dispersing medium containing an alcohol and water.

The alcohol may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol.

The alcohols may be used alone or in combination as a mixture of two or more of them.

The proportion of water is preferably from 10 to 99 mass %, more preferably from 40 to 99 mass %, among the dispersing medium (100 mass %). By increasing the proportion of water, it is possible to improve the dispersibility of polymer (H) or polymer (Q) in the dispersing medium.

The proportion of the alcohol is preferably from 1 to 90 mass %, more preferably from 1 to 60 mass %, among the dispersing medium (100 mass %).

The liquid composition may contain a fluorinated solvent. The fluorinated solvent may, for example, be a fluorinated solvent used for the solution polymerization method in the production of polymer (Q).

The solid content concentration of the liquid composition is preferably from 1 to 50 mass %, more preferably from 3 to 30 mass %. As the coating method, a known method may be employed.

The drying temperature is preferably from 40 to 130° C.

In order to stabilize the polymer electrolyte membrane 40, it is preferred to carry out heat treatment. The temperature for the heat treatment is preferably from 130 to 200° C. When the temperature for the heat treatment is at least 130° C., polymer (H) or polymer (Q) will not excessively contain water. When the temperature for the heat treatment is at most 200° C., heat decomposition of ionic groups may be suppressed, and a decrease in the proton conductivity of the polymer electrolyte membrane 40 may be suppressed.

The polymer electrolyte membrane 40 may be treated with an aqueous hydrogen peroxide solution as the case requires.

Process for Forming Catalyst Layer

The process for forming a catalyst layer of the present invention is a process for forming a catalyst layer in an electrode (first electrode 20 and/or second electrode 30) having a catalyst layer and a reinforcing layer, which comprises the following steps (a) and (b):

(a) a step of applying a coating fluid comprising a catalyst and an ion-exchange resin (hereinafter referred to as a coating fluid for catalyst layer) on a substrate to form a coating fluid layer, and (b) a step of disposing a reinforcing layer on the coating fluid layer formed in the step (a) and then drying the coating fluid layer to form a catalyst layer.

Step (a):

The substrate may, for example, be a release film; or a laminate having a polymer electrolyte membrane 40 formed on the surface of the release film.

The coating fluid for catalyst layer may be prepared by dispersing a catalyst in a solvent, and dissolving or dispersing an ion-exchange resin in the solvent.

In a case where the ion-exchange resin is a fluorinated ion-exchange resin, the solvent is preferably an alcohol or a fluorinated solvent.

The alcohol may, for example, be ethanol, n-propanol, isopropanol, n-butanol, isobutanol or tert-butanol. In order to increase the solubility of the ion-exchange resin, a mixed solvent of an alcohol with water may be employed.

As the fluorinated solvent, the following ones may be mentioned.

Hydrofluorocarbon: 2H-perfluoropropane, 1H,4H-perfluorobutane, 2H,3H-perfluoropentane, 3H,4H-perfluoro(2-methylpentane), 2H,5H-perfluorohexane, 3H-perfluoro(2-methylpentane), etc.

Fluorocarbon: perfluoro(1,2-dimethylcyclobutane), perfluorooctane, perfluoroheptane, perfluorohexane, etc.

Hydrochlorofluorocarbon: 1,1-dichloro-1-fluoroethane, 1,1,1-trifluoro-2,2-dichloroethane, 3,3-dichloro-1,1,1,2,2-pentafluoropropane, 1,3-dichloro-1,1,2,2,3-pentafluoropropane, etc.

Fluoroether: 1H,4H,4H-perfluoro(3-oxapentane), 3-methoxy-1,1,1,2,3,3-hexafluoropropane, etc.

Fluorinated alcohol: 2,2,2-trifluoroethanol, 2,2,3,3,3-pentafluoro-1-propanol, 1,1,1,3,3,3-hexafluoro-2-propanol, etc.

In a case where the ion-exchange resin is a non-fluorinated ion-exchange resin, the solvent may, for example, be N,N-dimethylformamide, dimethylsulfoxide, dimethylacetamide, N-methylpyrrolidone, methylene chloride, chloroform, carbon tetrachloride, 1,1,1-trichloroethane, 1,1,2-trichloroethane, trichloroethylene or tetrachloroethylene.

The solid content concentration in the coating fluid for catalyst layer is preferably from 5 to 25 mass %, more preferably from 8 to 15 mass %. When the solid content concentration in the coating fluid for catalyst layer is at least 5 mass %, penetration of the coating fluid for catalyst layer into the reinforcing layer is little when the reinforcing layer is disposed on the coating fluid layer. When the solid content concentration in the coating fluid for catalyst layer is at most 25 mass %, it is possible to form a catalyst layer having a uniform thickness. When the solid content concentration in the coating fluid for catalyst layer is from 8 to 15 mass %, the stability of the coating fluid for catalyst layer will be improved.

The viscosity of the coating fluid for catalyst layer is preferably from 200 to 8,000 mPa·s, more preferably from 1,000 to 4,000 mPa·s, when the shear rate is 1 (1/S). When the viscosity of the coating fluid for catalyst layer is at least 200 mPa·s, penetration of the coating fluid for catalyst layer into the reinforcing layer is little. When the viscosity of the coating fluid for catalyst layer is at most 8,000 mPa·s, it is possible to form a catalyst layer having a uniform thickness. When the viscosity of the coating fluid for catalyst layer is from 1,000 to 4,000 mPa·s, the stability of the coating fluid for catalyst layer will be improved.

F/C in the coating fluid for catalyst layer is preferably from 0.2 to 2.5, more preferably from 0.7 to 2.0. When F/C is at least 0.2, the catalyst layer will scarcely crack. When F/C is at most 2.5, the catalyst layer will not take a dense structure, whereby the gas diffusion property will be good. When F/C is from 0.7 to 2.0, the catalyst layer will more scarcely crack, and the gas diffusion property will be better.

The coating fluid layer may be a single layer or a plurality of layers. In the case of a plurality of layers, plural coating fluids for catalyst layer corresponding to the number of layers are prepared and simultaneously or sequentially applied. In the case of a plurality of layers, F/C of each coating fluid for catalyst layer is preferably adjusted so that it gradually increase as the layer becomes close to the polymer electrolyte membrane 40.

As the coating method, a batch coating method or a continuous coating method may be mentioned.

The batch coating method may, for example, be a bar coating method, a spin coating method or a screen printing method.

The continuous coating method may be a post-measuring method or a pre-measuring method. The post-measuring method is a method wherein an excess amount of the coating fluid for catalyst layer is applied and then, the coating fluid for catalyst layer is removed to bring the thickness to the prescribed level. The pre-measuring method is a method wherein the coating fluid for catalyst layer is applied in an amount required to obtain the prescribed thickness.

The post-measuring method may, for example, be an air doctor coating method, a blade coating method, a rod coating method, a knife coating method, a squeeze coating method, an impregnation coating method or a comma coating method.

The pre-measuring method may, for example, be a die-coating method, a reverse roll coating method, a transfer roll coating method, a gravure coating method, a kiss roll coating method, a cast coating method, a spray coating method, a curtain coating method, a calendar coating method or an extrusion coating method.

As the coating method, a screen printing method or a die-coating method is preferred from such a viewpoint that a coating fluid layer having a uniform thickness can thereby be formed, and a die-coating method is more preferred from the viewpoint of the production efficiency.

Step (b):

Preliminarily, the release film is removed from the reinforcing layer.

The coating fluid layer is a coated film formed by applying the coating fluid for catalyst layer, wherein all or part of the solvent contained in the coating fluid for catalyst layer still remains. The solvent remaining in the coating fluid layer is preferably at least 20 mass %, based on the solvent (100 mass %) contained in the coating fluid for catalyst layer.

Placing the reinforcing layer on the coating fluid layer may be immediately after the application of the coating fluid for catalyst layer on the substrate, or after evaporating a part of the solvent contained in the coating fluid layer. Usually, water or an alcohol is used as the solvent, and therefore, it is preferred to place the reinforcing layer on the coating fluid layer within five minutes after the application of the coating fluid for catalyst layer on the substrate.

A part of the solvent contained in the coating fluid layer may be evaporated at room temperature or evaporated under heating. The heating temperature to evaporate a part of the solvent contained in the coating fluid layer before placing the reinforcing layer on the coating fluid layer, is preferably at most 100° C.

The drying temperature to dry the coating fluid layer after placing the reinforcing layer on the coating fluid layer, is preferably from 50 to 150° C. When the drying temperature is at least 50° C., the drying does not take time, and the ion-exchange resin in the catalyst layer will be sufficiently heat-treated and stabilized. When the drying temperature is at most 150° C., the catalyst layer will not be deteriorated, and the catalyst layer will not be burnt.

In a case where drying of the coating fluid layer is carried out in a continuous drying furnace, it is preferred to gradually raise the drying temperature, and it is more preferred that the inlet temperature of the drying furnace is set to be from 50 to 80° C., and the outlet temperature of the drying furnace is set to be from 120 to 150° C., whereby the drying time will be short, the ion-exchange resin in the catalyst layer will be sufficiently heat-treated to have a stabilized structure, and the power generation characteristics of the polymer electrolyte fuel cell will be good.

The drying time to dry the coating fluid layer after placing the reinforcing layer on the coating fluid layer, is preferably from 3 to 30 minutes, more preferably from 5 to 15 minutes. When the drying time is at least 3 minutes, drying can be carried out sufficiently, and substantially no solvent will remain. When the drying time is at most 30 minutes, the productivity will be improved, and even if the drying temperature is as high as higher than 130° C., deterioration of the catalyst layer will scarcely proceed. When the drying time is from 5 to 15 minutes, the power generation characteristics of the polymer electrolyte fuel cell will also be sufficiently provided.

Processes for Producing Membrane/Electrode Assembly

The following processes (I) to (III) may be mentioned as processes for producing the membrane/electrode assembly of the present invention.

The process (I) is a process which comprises the following steps (a') to (c'), (a''') to (c'''), (d') and (e'):

(a') a step of applying the coating fluid for catalyst layer on a release film to form a coating fluid layer, (b') a step of disposing a reinforcing layer on the coating fluid layer formed in the step (a') and then drying the coating fluid layer to form a first catalyst layer, (c') a step of removing the release film from the first catalyst layer formed in the step (b') to obtain a first laminate comprising the first catalyst layer and the reinforcing layer, (a''') a step of applying the coating fluid for catalyst layer on a release film to form a coating fluid layer, (b''') a step of disposing a reinforcing layer on the coating fluid layer formed in the step (a''') and then drying the coating fluid layer to form a second catalyst layer, (c''') a step of removing the release film from the second catalyst layer formed in the step (b''') to obtain a first' laminate comprising the second catalyst layer and the reinforcing layer, (d') a step of bonding the first laminate obtained in the step (c') and the first' laminate obtained in the step (c''') with a polymer electrolyte membrane so that the first catalyst layer of the first laminate is in contact with the polymer electrolyte membrane, and the second catalyst layer of the first' laminate is in contact with the other side of the polymer electrolyte membrane, and (e') as the case requires, a step of bonding the fifth laminate constituted by the reinforcing layer/the first catalyst layer/the polymer electrolyte membrane/the second catalyst layer/the reinforcing layer, obtained in the step (d'), with a gas diffusion layer, to obtain a membrane/electrode assembly.

The process (II) is a process comprising the following steps (a') to (c'), (a'') to (c''), (d'') and (e'):

(a') a step of applying the coating fluid for catalyst layer on a release film to form a coating fluid layer, (b') a step of disposing a reinforcing layer on the coating fluid layer formed in the step (a') and then drying the coating fluid layer to form a first catalyst layer, (c') a step of removing the release film from the first catalyst layer formed in the step (b') to obtain a first laminate comprising the first catalyst layer and the reinforcing layer, (a'') a step of applying a coating fluid for catalyst layer on a polymer electrolyte membrane formed on a release film to form a coating fluid layer, (b'') a step of disposing a reinforcing layer on the coating fluid layer formed in the step (a'') and then drying the coating fluid layer to form a second catalyst layer, (c'') a step of removing the release film from the polymer electrolyte membrane after the step (b'') to obtain a second laminate comprising the polymer electrolyte membrane, the second catalyst layer and the reinforcing layer, (d'') a step of bonding the first laminate obtained in the step (c'), with the second laminate obtained in the step (c'') so that the first catalyst layer of the first laminate is in contact with the polymer electrolyte membrane of the second laminate, and (e') as the case requires, a step of bonding the fifth laminate constituted by the reinforcing layer/the first catalyst layer/the polymer electrolyte membrane/the second catalyst layer/the reinforcing layer, obtained in the step (d''), with a gas diffusion layer, to obtain a membrane/electrode assembly.

The process (III) is a process comprising the following steps (h) to (j), (h') to (j'), (k) and (e'):

(h) a step of applying a coating fluid comprising a catalyst and an ion-exchange resin, on a first ion-exchange resin membrane formed on a release film, to form a coating fluid layer, (i) a step of disposing a reinforcing layer on the coating fluid layer formed in the step (h) and then drying the coating fluid layer to form a first catalyst layer, (j) a step of removing the release film from the first ion-exchange membrane after the step (i) to obtain a third laminate comprising the first ion-exchange resin membrane, the first catalyst layer and the reinforcing layer, (h') a step of applying a coating fluid comprising a catalyst and an ion-exchange resin, on a second ion-exchange resin membrane formed on a release film, to form a coating fluid layer, (I') a step of disposing a reinforcing layer on the coating fluid layer formed in the step (h') and then drying the coating fluid layer to form a second catalyst layer, (j') a step of removing the release film from the second ion-exchange membrane after the step (I') to obtain a fourth laminate comprising the second ion-exchange resin membrane, the second catalyst layer and the reinforcing layer, (k) a step of bonding the third laminate obtained in the step (j) with the fourth laminate obtained in the step (j') so that the first ion-exchange resin membrane of the third laminate is in contact with the second ion-exchange resin membrane of the fourth laminate thereby to form a polymer electrolyte membrane comprising the first ion-exchange resin membrane and the second ion-exchange resin membrane, and (e') as the case requires, a step of bonding the fifth laminate constituted by the reinforcing layer/the first catalyst layer/the polymer electrolyte membrane/the second catalyst layer/the reinforcing layer, obtained in the step (k), with a gas diffusion layer, to obtain a membrane/electrode assembly.

Process (I)

Figure 2:
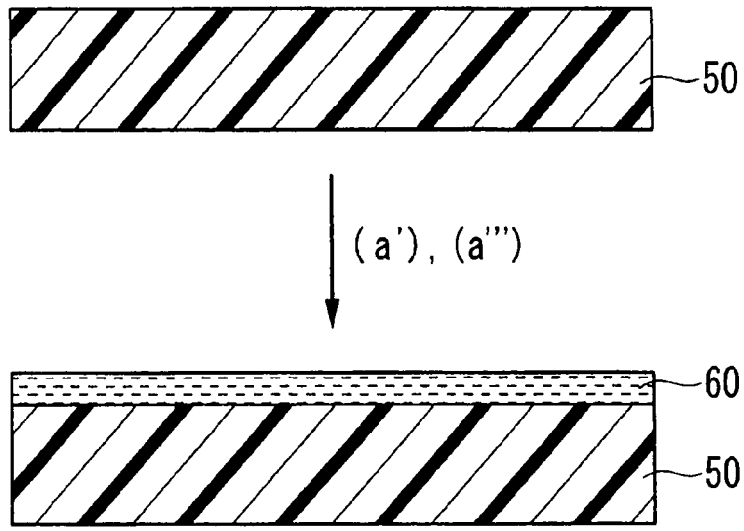
FIG. 2 is a cross sectional view illustrating steps (a') and (a''') in the process for producing a membrane/electrode assembly of the present invention.

Step (a') and step (a'''):

As shown in FIG. 2, a coating fluid for catalyst layer is applied on a release film 50 to form a coating fluid layer 60.

The step (a') and the step (a''') may be carried out in the same manner as the above-mentioned step (a).

Figure 3:
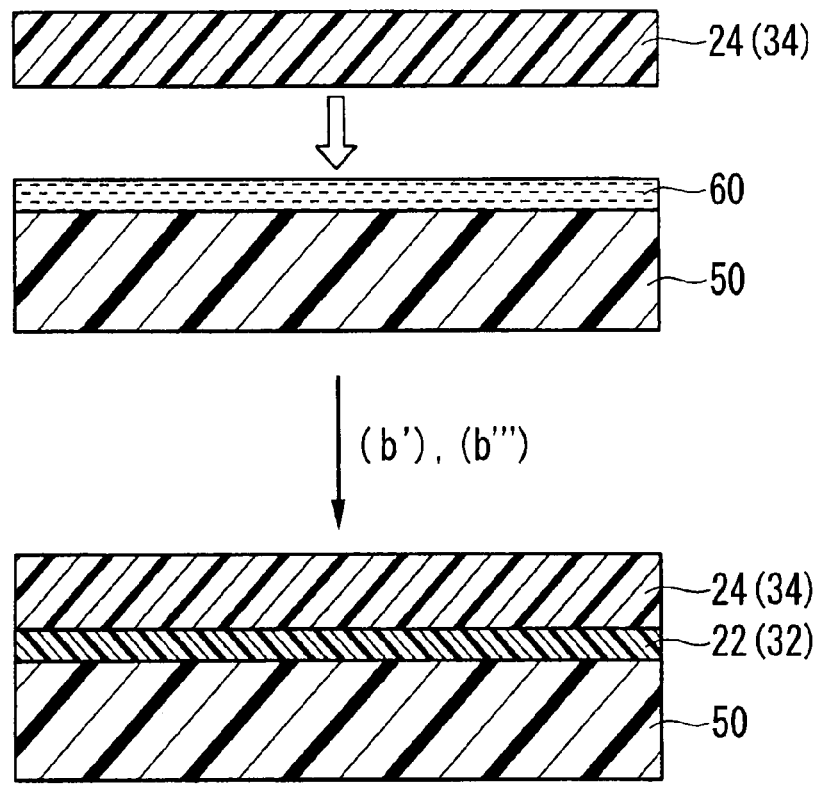
FIG. 3 is a cross sectional view illustrating steps (b') and (b''') in the process for producing a membrane/electrode assembly of the present invention.

Step (b') and step (b'''):

As shown in FIG. 3, a reinforcing layer 24 (34) is disposed on the coating fluid layer 60 formed in the step (a') (the step (a''')) and then the coating fluid layer 60 is dried to form a first catalyst layer 22 (a second catalyst layer 32).

The step (b') and the step (b''') may be carried out in the same manner as the above-mentioned step (b).

Figure 4:
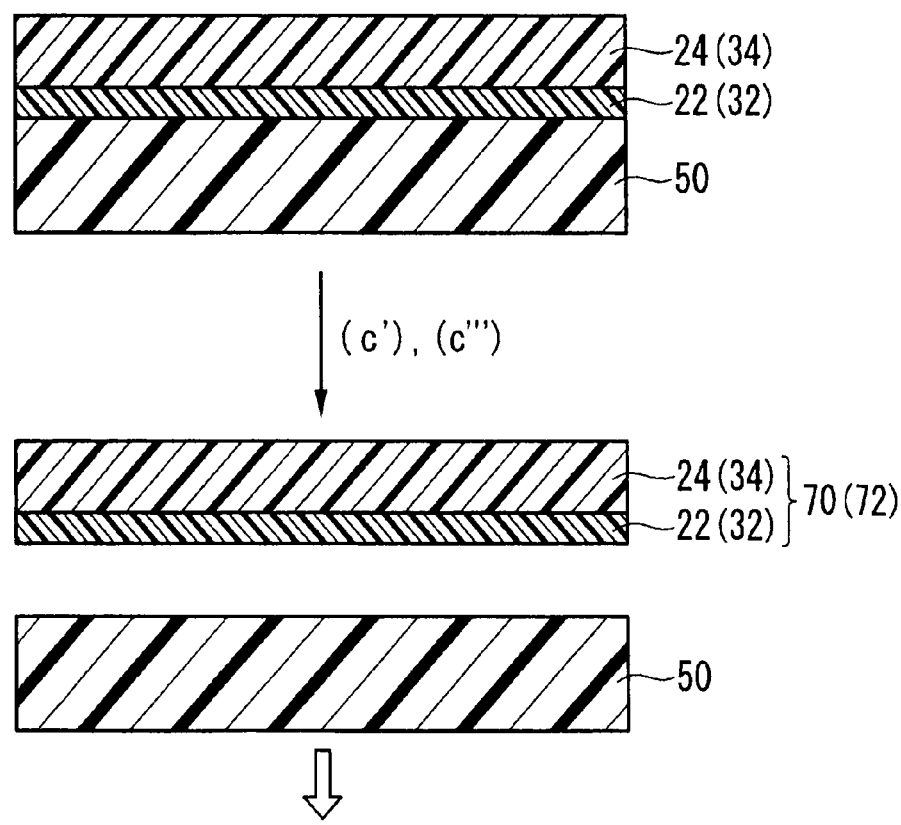
FIG. 4 is a cross sectional view illustrating steps (c') and (c''') in the process for producing a membrane/electrode assembly of the present invention.

Step (c') and step (c'''):

As shown in FIG. 4, the release film 50 is removed from the first catalyst layer 22 (the second catalyst layer 32) formed in the step (b') (the step (b''')) to obtain a first laminate 70 (a first' laminate 72) comprising the first catalyst layer 22 (the second catalyst layer 32) and the reinforcing layer 24 (34).

Figure 5:
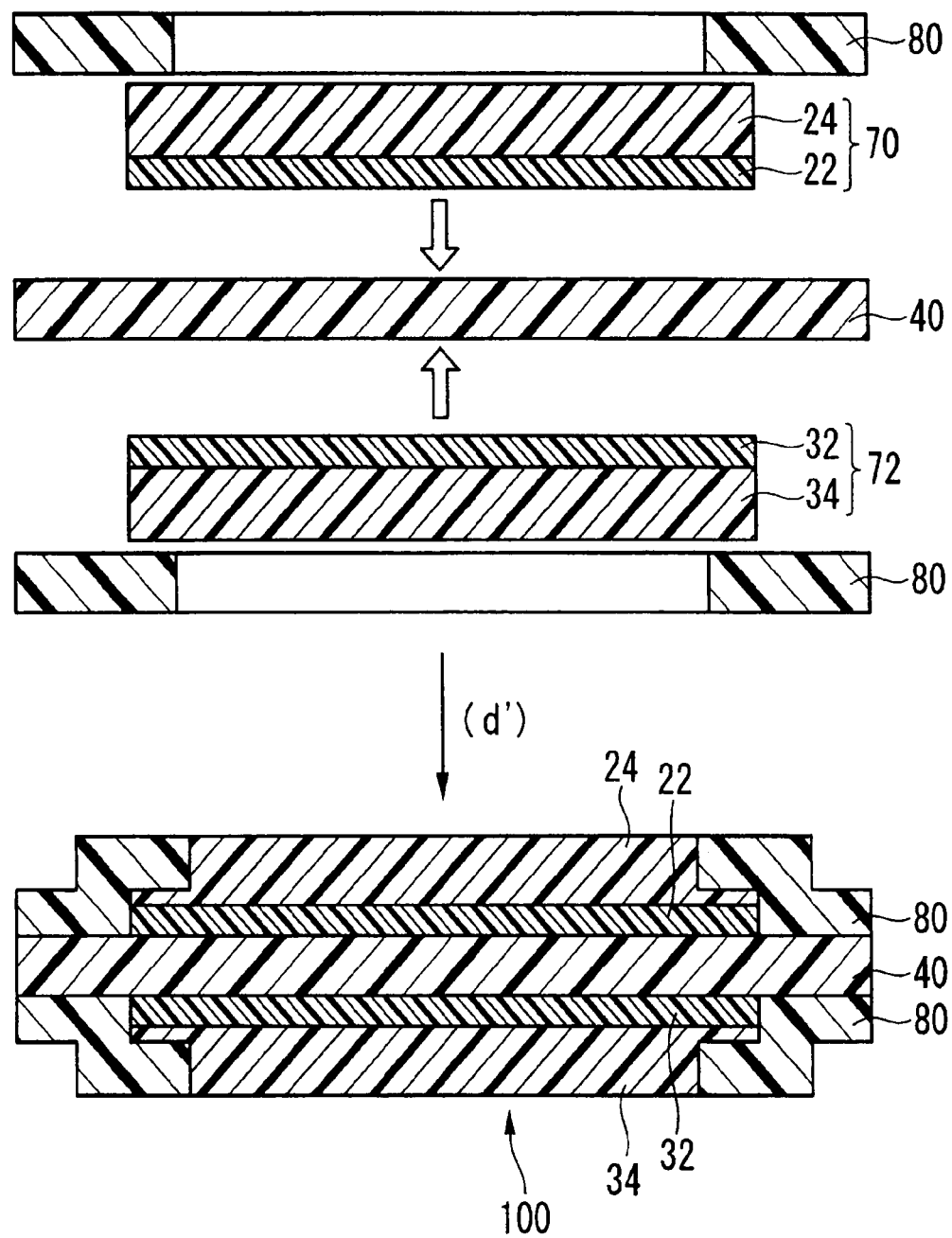
FIG. 5 is a cross sectional view illustrating step (d') in the process for producing a membrane/electrode assembly of the present invention.

Step (d'):

As shown in FIG. 5, the first laminate 70 obtained in the step (c'), the first' laminate 72 obtained in the step (c''') and the polymer electrolyte membrane 40 are laminated so that the first catalyst layer 22 of the first laminate 70 is in contact with the polymer electrolyte membrane 40, and the second catalyst layer 32 of the first' laminate 72 is in contact with the polymer electrolyte membrane 40. Further, as the case requires, two frame-shaped subgaskets 80 may be disposed on and underneath a laminate constituted by the first laminate 70/the polymer electrolyte membrane 40/the first' laminate 72. After laminating them, they are bonded thereby to obtain a fifth laminate 100 constituted by the reinforcing layer/the first catalyst layer/the polymer electrolyte membrane/the second catalyst layer/the reinforcing layer and, as the case requires, the peripheral portion is sandwiched by the two sheets of subgaskets 80.

A subgaskets 80 is one having such a size that after bonding, its peripheral portion is in contact with the polymer electrolyte membrane 40, and the area of its opening portion is smaller than the area of the first laminate 70 or the first' laminate 72.

The material for the subgaskets 80 may, for example, be a non-fluorinated resin (such as PET, polyethylene naphthalate (hereinafter referred to as PEN), polyethylene polypropylene or polyimide) or a fluorinated resin (such as PTFE, ETFE, FEP or PFA).

The bonding method may, for example, be a hot-pressing method, a hot roll pressing method or ultrasonic fusion, and from the viewpoint of the in-plane uniformity, a hot-pressing method is preferred.

The pressing temperature (the temperature of the press plate in the pressing machine) is preferably from 120 to 180° C., more preferably from 130 to 170° C. When the pressing temperature is at least 120° C., bonding can sufficiently be carried out, and an increase in resistance due to contact failure can be suppressed. When the pressing temperature is at most 170° C., the catalyst layer tends to be scarcely deteriorated, and the polymer electrolyte membrane 40 scarcely undergoes deformation. When the pressing temperature is from 130 to 170° C., the power generation characteristics and durability of the polymer electrolyte fuel cell will be good.

The pressing pressure is preferably 0.5 to 5 MPa, more preferably from 1 to 4 MPa. When the pressing pressure is at least 0.5 MPa, bonding will be sufficiently carried out, and an increase in resistance due to contact failure can be suppressed. When the pressing pressure is at most 5 MPa, the catalyst layer scarcely undergoes deterioration, and the polymer electrolyte membrane 40 scarcely undergoes deformation. When the pressing pressure is from 1 to 4 MPa, the power generation characteristics and durability of the polymer electrolyte fuel cell will be good.

Figure 6:
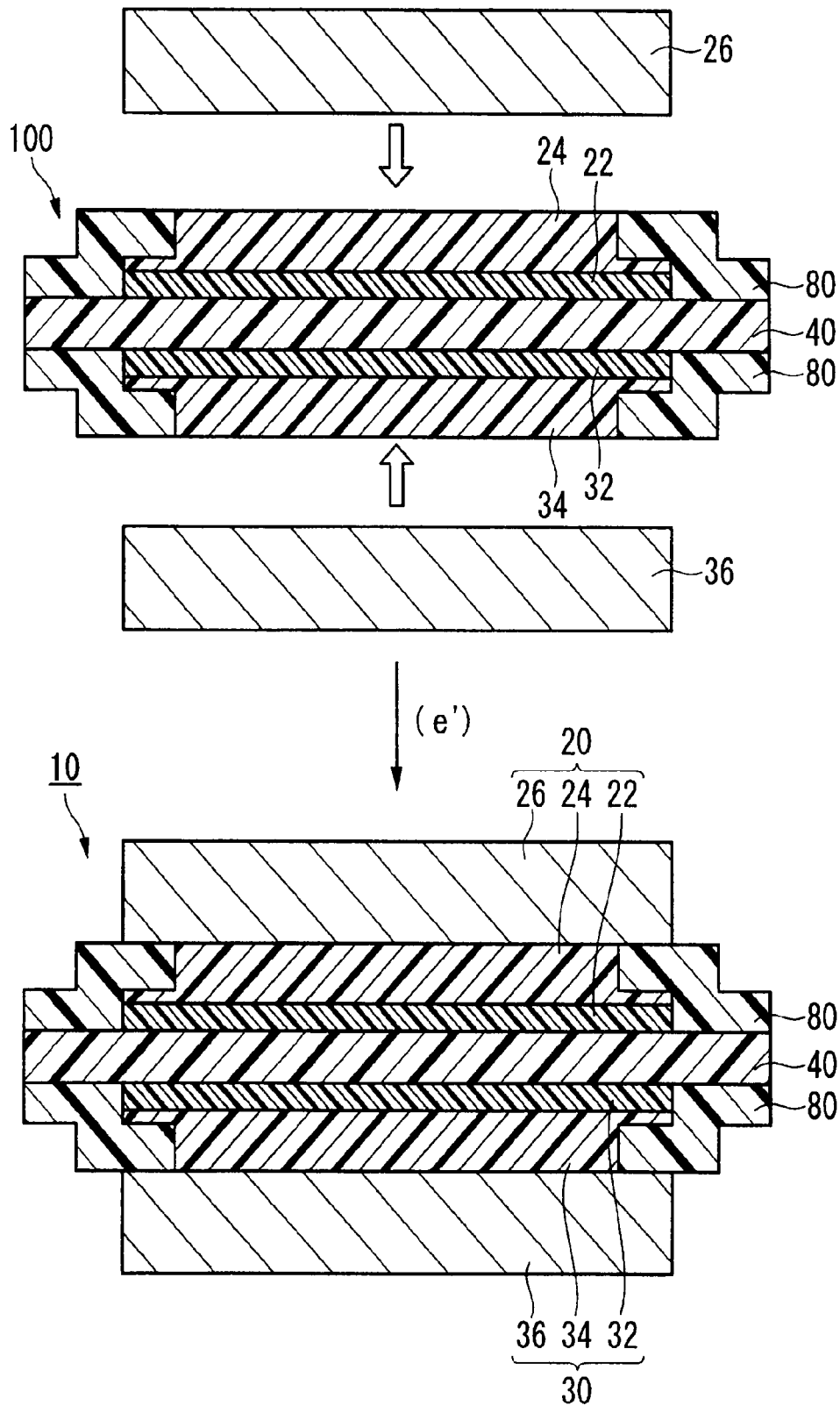
FIG. 6 is a cross sectional view illustrating step (e') in the process for producing a membrane/electrode assembly of the present invention.

The pressing time is preferably from 0.5 to 10 minutes, more preferably from 1 to 5 minutes. When the pressing time is at least 0.5 minute, bonding can sufficiently be carried out, and an increase in resistance due to contact failure can be suppressed. When the pressing time is at most 10 minutes, the catalyst layer scarcely undergoes deterioration, and the polymer electrolyte membrane 40 scarcely undergoes deformation. When the pressing time is from 1 to 5 minutes, the power generation characteristics and durability of the polymer electrolyte fuel cell will be good Step (e'):

As shown in FIG. 6, the fifth laminate 100 is sandwiched by two sheets of gas diffusion substrates (the gas diffusion layer 26 and the gas diffusion layer 36), and they are bonded to obtain a membrane/electrode assembly 10.

The bonding method may, for example, be a hot pressing method, a hot roll pressing method or an ultrasonic fusion method, and from the viewpoint of the in-plane uniformity, a hot pressing method is preferred.

The temperature of the press plate in the pressing machine is preferably from 100 to 150° C.

Figure 7:
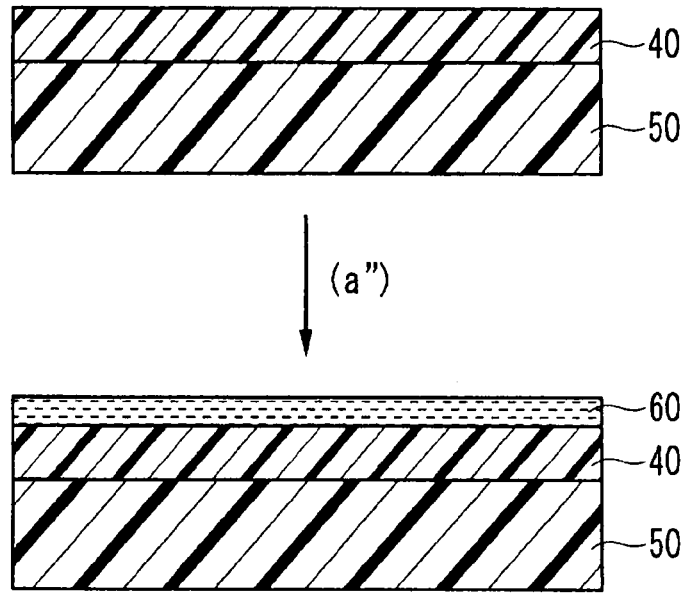
FIG. 7 is a cross sectional view illustrating step (a'') in the process for producing a membrane/electrode assembly of the present invention.

The pressing pressure is preferably from 0.5 to 4.0 MPa.
Process (II):
Steps (a') to (c'):

The steps (a') to (c') are carried out in the same manner as the steps (a') to (c') in the above process (I).
Step (a"):

As shown in FIG. 7, a coating fluid for catalyst layer is applied on a polymer electrolyte membrane 40 formed on a release film 50 to form a coating fluid layer 60.

Figure 8:
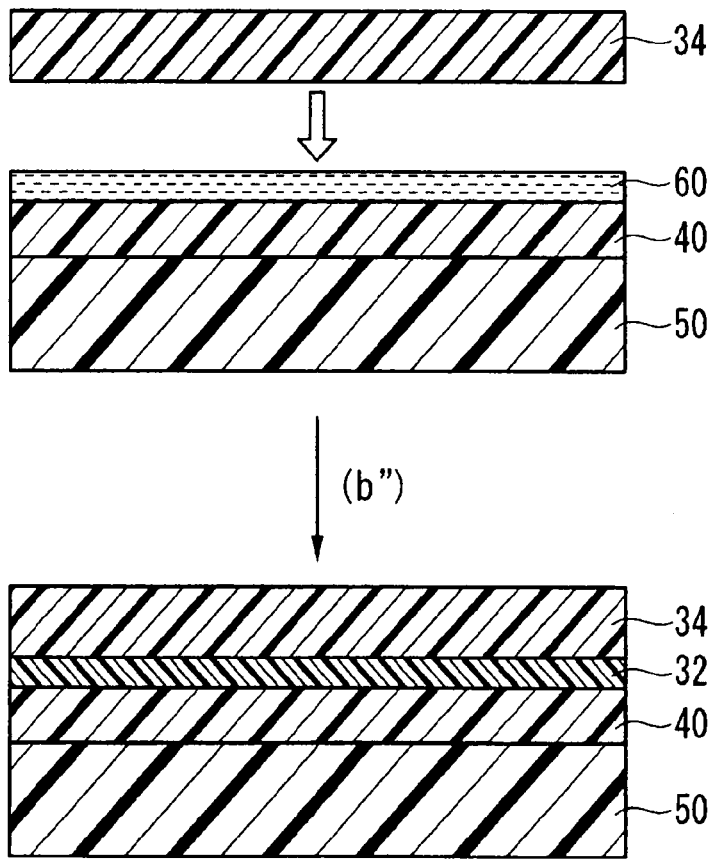
FIG. 8 is a cross sectional view illustrating step (b'') in the process for producing a membrane/electrode assembly of the present invention.

The step (a") may be carried out in the same manner as the step (a') in the above process (I). Step (b"):

As shown in FIG. 8, a reinforcing layer 34 is disposed on the coating fluid layer 60 formed in the step (a"), and then the coating fluid layer 60 is dried to form a second catalyst layer 32.

Figure 9:
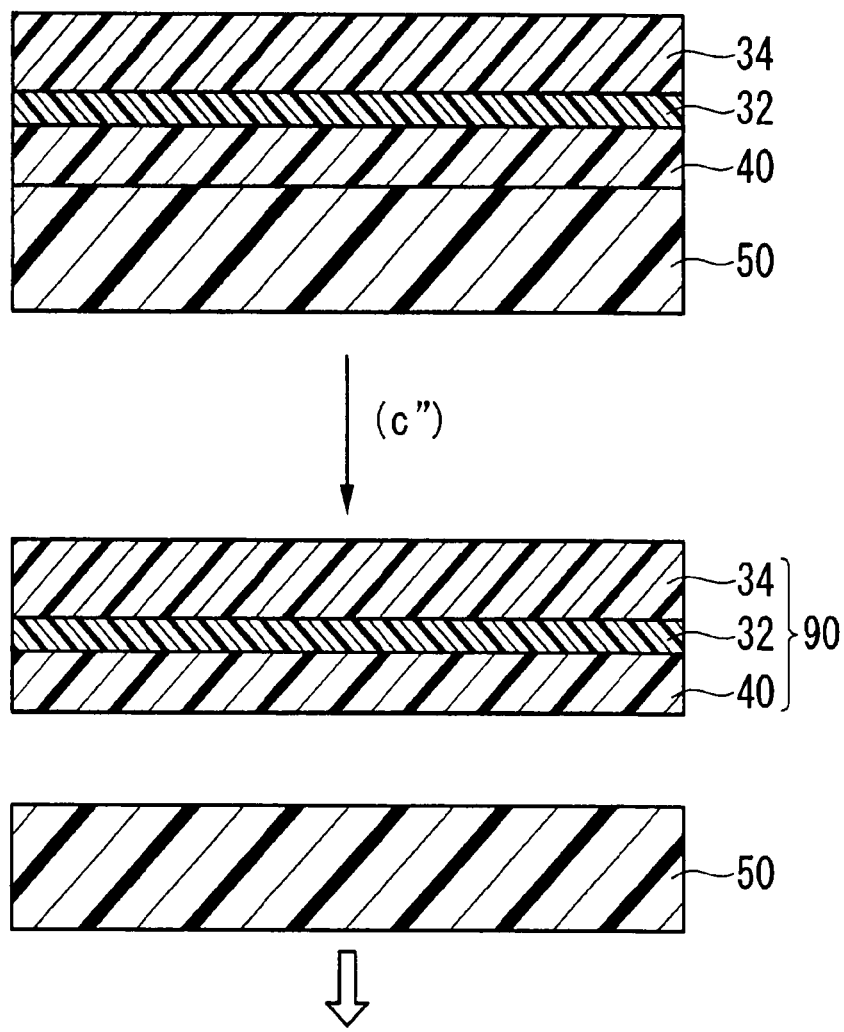
FIG. 9 is a cross sectional view illustrating step (c'') in the process for producing a membrane/electrode assembly of the present invention.
Figure 10:
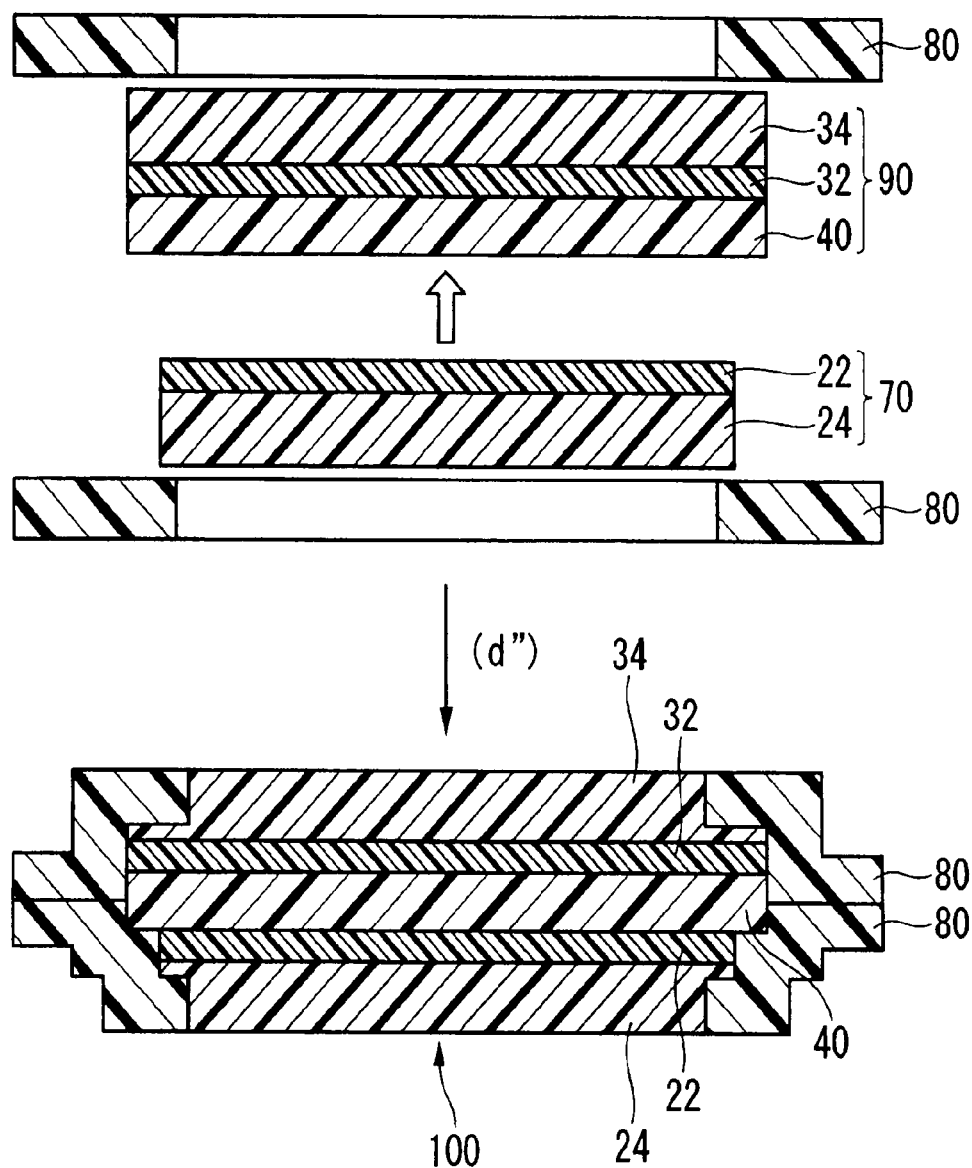
FIG. 10 is a cross sectional view illustrating step (d'') in the process for producing a membrane/electrode assembly of the present invention.

The step (b") may be carried out in the same manner as the step (b') in the above process (I). Step (c"):

As shown in FIG. 9, the release film 50 is removed from the polymer electrolyte membrane 40 after the step (b") to obtain a second laminate 90 comprising the polymer electrolyte membrane 40, the second catalyst layer 32 and the reinforcing layer 34.
Step (d"):

As shown in FIG. 10, the first laminate 70 obtained in the step (c') and the second laminate 90 obtained in the step (c") are laminated so that the first catalyst layer 22 of the first laminate 70 is in contact with the polymer electrolyte membrane 40 of the second laminate 90. Further, as the case requires, two sheets of frame-shaped subgaskets 80 may be disposed on and beneath the laminate constituted by the first laminate 70/the polymer electrolyte membrane 40/the second laminate 90. After laminating them, they are bonded to obtain a fifth laminate 100 constituted by the reinforcing layer/the first catalyst layer/the polymer electrolyte membrane/the second catalyst layer/the reinforcing layer, and, as the case requires, its peripheral portion is sandwiched by two sheets of subgaskets 80.

The area of the first laminate 70 is preferably made smaller than the area of the second laminate 90 so that the peripheral portion on one side of the polymer electrolyte membrane 40 can be bonded to the subgasket 80. By bonding the peripheral portion of the polymer electrolyte membrane 40 to the subgasket 80, the gas sealing property will be improved.

Figure 11:
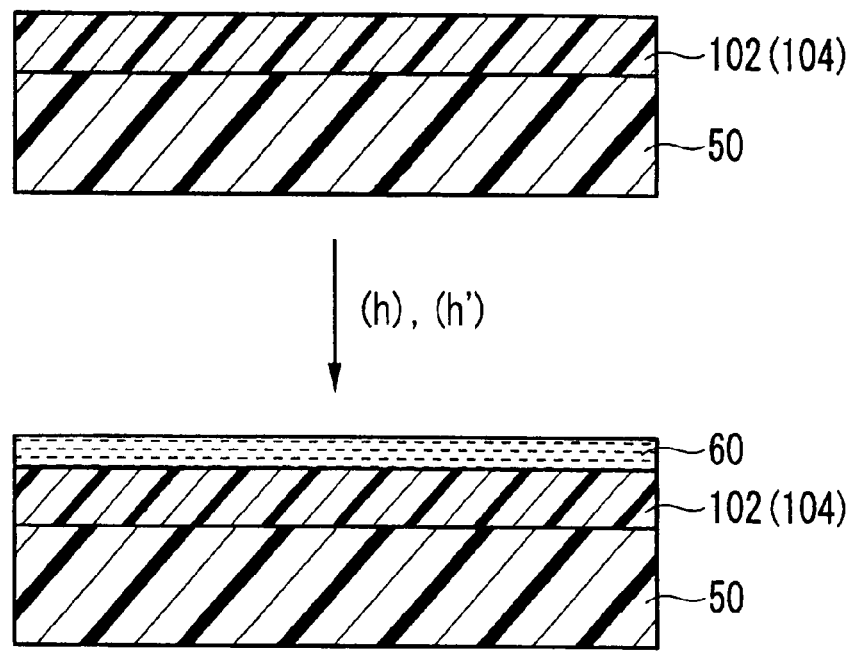
FIG. 11 is a cross sectional view illustrating steps (h) and (h') in the process for producing a membrane/electrode assembly of the present invention.

The bonding method and conditions are the same as in the step (d') in the above process (I). Step (e'):

The step (e') is carried out in the same manner as the step (e') in the above process (I).
Process (III)
Step (h) and step (h'):

As shown in FIG. 11, a coating fluid for catalyst layer is applied on a first ion-exchange resin membrane 102 (a second ion-exchange resin membrane 104) formed on a release film 50 to form a coating fluid layer 60.

Figure 12:
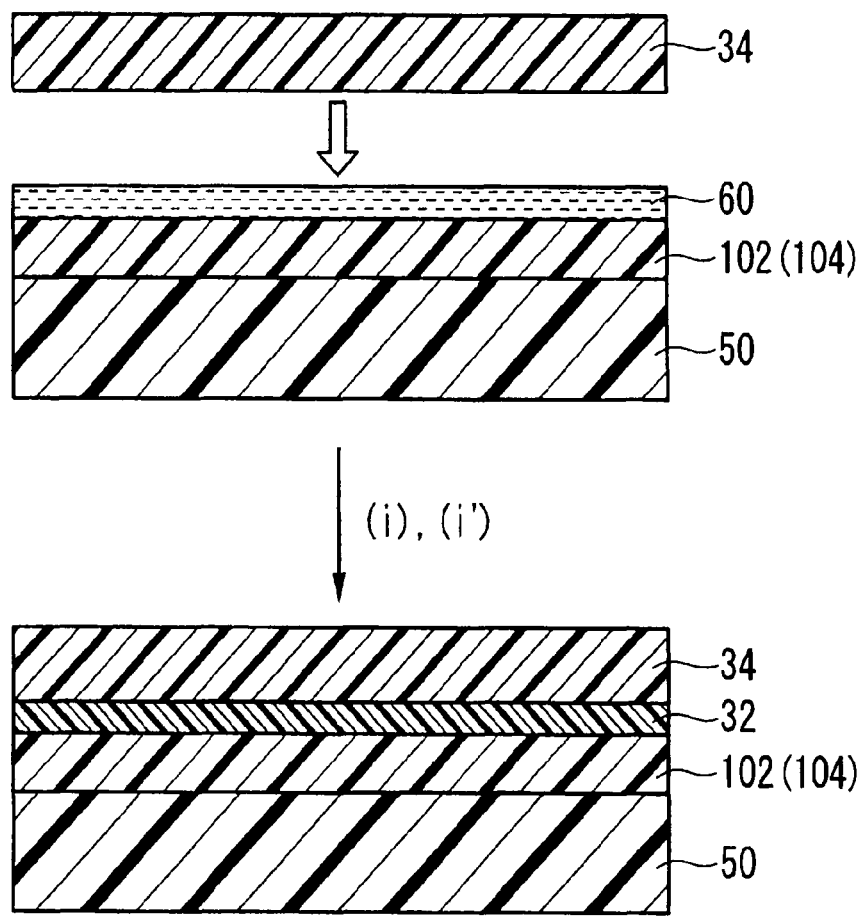
FIG. 12 is a cross sectional view illustrating steps (i) and (i') in the process for producing a membrane/electrode assembly of the present invention.

The step (h) and the step (h') may be carried out in the same manner as the step (a') in the above process (I).
Step (i) and Step (i'):

As shown in FIG. 12, a reinforcing layer 24 (34) is disposed on the coating fluid layer 60 formed in the step (h) (the step (h')), and then the coating fluid layer 60 is dried to form a first catalyst layer 22 (a second catalyst layer 32).

Figure 13:
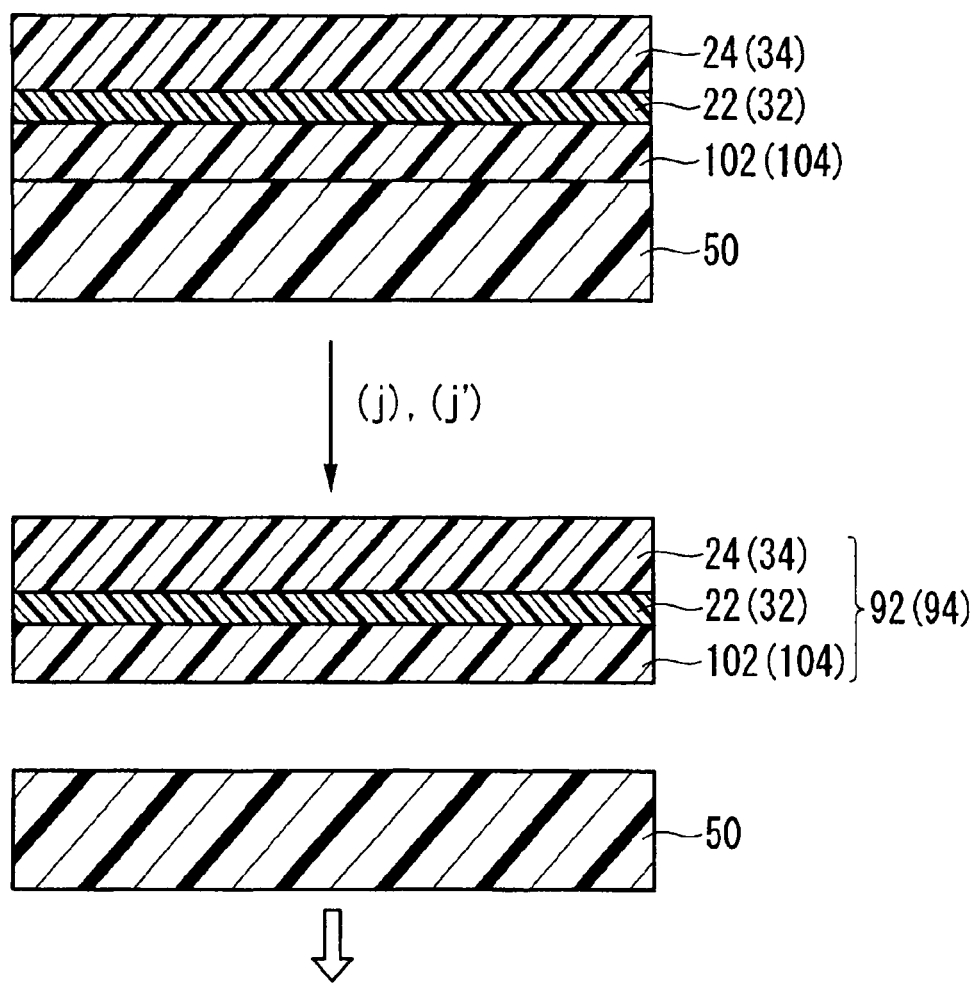
FIG. 13 is a cross sectional view illustrating steps (j) and (j') in the process for producing a membrane/electrode assembly of the present invention.

The step (i) and the step (i') may be carried out in the same manner as in the step (b') in the above process (I).
Step (j) and Step (j'):

As shown in FIG. 13, the release film 50 is removed from the first ion-exchange resin membrane 102 (the second ion-exchange resin membrane 104) after the step (i) (the step (i')) to obtain a third laminate 92 comprising the first ion-exchange resin membrane 102, the first catalyst layer 22 and the reinforcing layer 24 (a fourth laminate 94 comprising the second ion-exchange resin membrane 104, the second catalyst layer 32 and the reinforcing layer 34).

Figure 14:
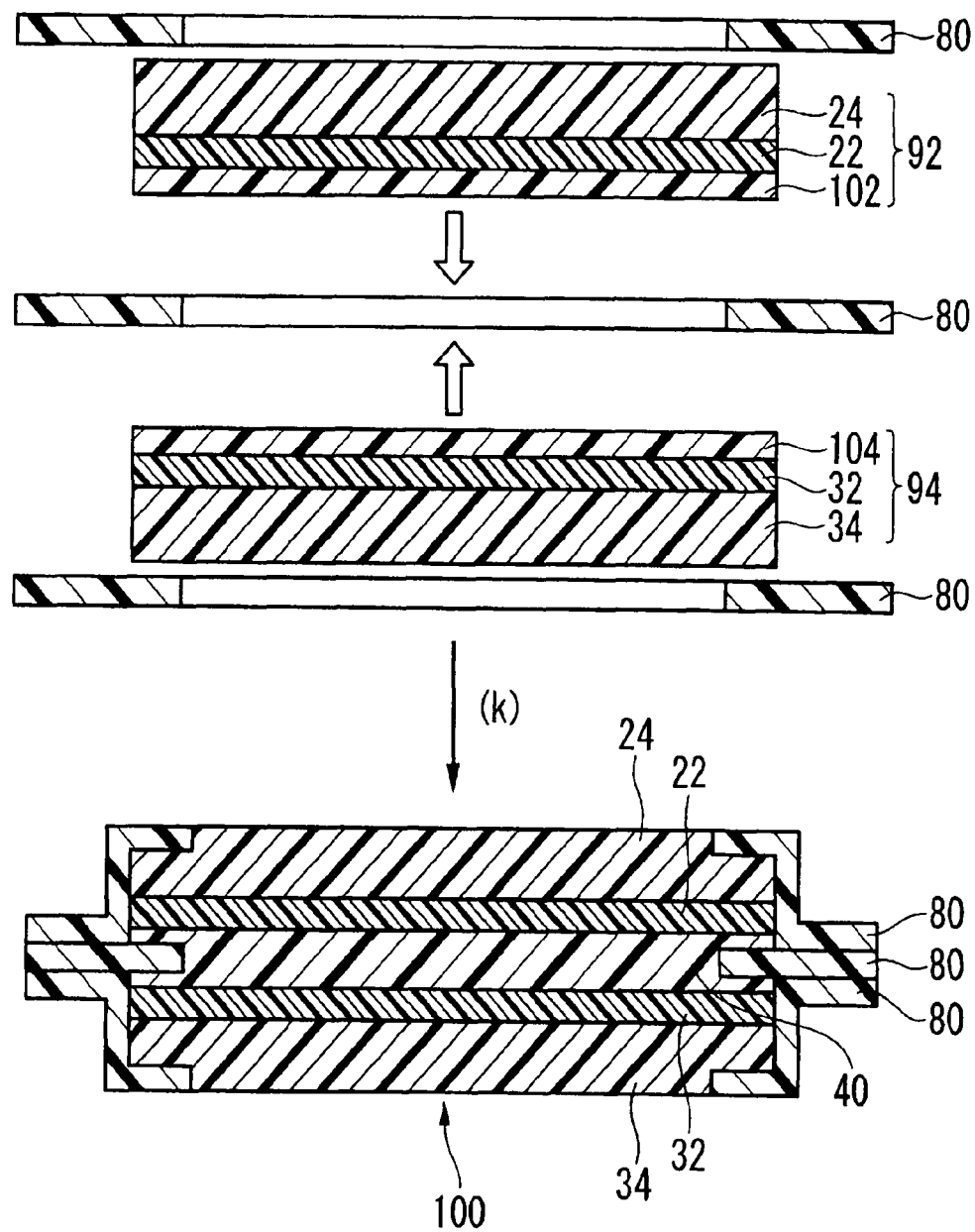
FIG. 14 is a cross sectional view illustrating step (k) in the process for producing a membrane/electrode assembly of the present invention.

Here, the thickness of the first ion-exchange resin membrane 102 or the second ion-exchange resin membrane 104 is one half of the thickness of the polymer electrolyte membrane 40. Step (k):

As shown in FIG. 14, the third laminate 92 and the fourth laminate 94 obtained in the step (j) and the step (j') are laminated so that the first ion-exchange resin membrane 102 of the third laminate 92 is in contact with the second ion-exchange resin membrane 104 of the fourth laminate 94 via the opening portion of the frame-shaped subgasket 80 disposed between the third laminate 92 and the fourth laminate 94. Further, as the case requires, two sheets of frame-shaped subgaskets 80 may be disposed on and beneath the laminate constituted by the third laminate 92/(the subgasket 80)/the fourth laminate 94. After laminating them, they are bonded thereby to obtain a fifth laminate constituted by the reinforcing layer/the first catalyst layer/the polymer electrolyte membrane/the second catalyst layer/the reinforcing layer, wherein the polymer electrolyte membrane is surrounded by the subgasket 80, and, if necessary, its peripheral portion is sandwiched by two sheets of subgaskets 80.

The thickness of each subgasket 80 is preferably made to be thinner than the thickness of the subgasket 80 used in the above process (I) or (II).

The bonding method and conditions are the same as in the step (d') in the above process (I). Step (e'):

The step (e') is carried out in the same manner as the step (e') in the above process (I).

According to the process for producing a membrane/electrode assembly 10 by the above-described processes (I) to (III), the reinforcing layer 24 (34) is placed on the coating fluid layer 60 after forming the coating fluid layer 60 without completely drying the coating fluid layer 60 in a state where the coating fluid layer 60 contains a solvent, and the coating fluid layer 60 is dried in such a state to form the first catalyst layer 22 (the second catalyst layer 32), whereby defects such as cracks will not be formed in the catalyst layer.

Further, a part of the coating fluid layer 60 penetrate into the reinforcing layer 24 (34) to improve the bond strength between the obtainable first catalyst layer 22 (the second catalyst layer 32) and the reinforcing layer 24 (34).

Further, in the processes (I) and (II), the first catalyst layer 22 (the second catalyst layer 32) is formed after forming the coating fluid layer 60 on the release film 50, whereby the ion-exchange resin will be present in a larger amount on the release film 50 side of the first catalyst layer 22 (the second catalyst layer 32). Accordingly, the bond strength at the interface between the first catalyst layer 22 (the second catalyst layer 32) and the polymer electrolyte membrane 40 by the heat bonding will be high, and the resistance at the interface will be low, and the power generation characteristics of the polymer electrolyte fuel cell will be good.

Further, in the processes (II) and (III), the first catalyst layer 22 (the second catalyst layer 32) is formed after forming the coating fluid layer 60 on the polymer electrolyte membrane 40 (the ion-exchange resin membrane), whereby the ion-exchange resin of the first catalyst layer 22 (the second catalyst layer 32) will be firmly bonded to the polymer electrolyte membrane 40 (ion-exchange resin membrane). Accordingly, the resistance at the interface will be low, and the power generation characteristics of the polymer electrolyte fuel cell will be good.

And, the membrane/electrode assembly 10 obtained by the processes (I) to (III) has no reinforcing material present in the polymer electrolyte membrane 40, whereby the ion conductivity of the polymer electrolyte membrane 40 will not be impaired. As a result, high power generation performance can be obtained even under a low humidity condition.

Further, the first electrode 20 and/or the second electrode 30 has a reinforcing layer between the catalyst layer and the gas diffusion layer, whereby it has sufficient mechanical strength.

Further, since the bond strength at each interface is high, the dimensional stability is maintained by the reinforcing layer.

Further, since the bond strength at each interface is high, there is no deterioration of the output voltage of the polymer electrolyte fuel cell due to peeling even in a case where the humidifying degree is changed. That is, the polymer electrolyte fuel cell has excellent durability even in an environment where humidifying and drying, etc. are repeated.

Further, the membrane/electrode assembly 10 provides the following effects as it has the reinforcing layer.

(i) By disposing the inner edge portion of a subgasket 80 to protect the polymer electrolyte membrane 40 along the peripheral portion of the reinforcing layer, the reinforcing layer serves as a cushioning material at the time of the heat bonding thereby to prevent the inner edge portion of the subgasket 80 from biting into the polymer electrolyte membrane 40. It is thereby possible to prevent local thinning of the polymer electrolyte membrane 40 thereby to improve the mechanical strength.

(ii) When the gas diffusion layer is heat-bonded, it is possible to prevent by the reinforcing layer a physical damage such that fibers, etc. constituting the gas diffusion layer will pierce into the polymer electrolyte membrane 40. It is thereby possible to prevent short-circuiting of the membrane/electrode assembly 10. That is, the durability will be excellent.

(iii) The inner edge portion of the subgasket 80 will bite into the peripheral portion of the reinforcing layer, whereby a difference in level by the subgasket 80 is scarcely formed on each side of the fifth laminate. It is thereby possible to carry out bonding of the gas diffusion layer satisfactorily.

Further, by disposing the polymer electrolyte membrane 40 and the subgaskets 80 so that they are partially in contact with each other, the membrane/electrode assembly 10 is capable of suppressing leakage of a gas such as hydrogen gas.

Further, as another embodiment of the present invention, a coating fluid layer for reinforcing layer is formed, and a catalyst layer is bonded thereon, and after the bonding, the coating fluid layer for reinforcing layer is dried to form a reinforcing layer, whereby the adhesion can likewise be improved.

Further, as another embodiment of the present invention, a coating fluid layer for reinforcing layer and a coating fluid layer for catalyst layer are bonded, and after the bonding, the coating fluid layer for reinforcing layer and the coating fluid layer for catalyst layer are dried to form a reinforcing layer and a catalyst layer, whereby the adhesion can likewise be improved.

Polymer Electrolyte Fuel Cell

A polymer electrolyte fuel cell is obtained by disposing a separator having grooves formed to constitute gas flow paths, on each side of the membrane/electrode assembly obtained by the process of the present invention.

As the separator, separators made of various electrically conductive materials may be mentioned such as a separator made of metal, a separator made of carbon and a separator made of a material having graphite and a resin mixed.

With such a polymer electrolyte fuel cell, power generation is carried out by supplying a gas containing oxygen to the cathode and a gas containing hydrogen to the anode. Further, the membrane/electrode assembly obtained by the process of the present invention may be applied also to a methanol fuel cell whereby power generation is carried out by supplying methanol to the anode.

By the polymer electrolyte fuel cell to which the membrane/electrode assembly obtained by the process of the present invention is applied, stable power generation is possible even under a low humidity condition, and a peripheral instrument such as a humidifier may be simplified, such being advantageous from the viewpoint of the cost and size reduction.

EXAMPLES

Now, the present invention will be described in further detail with reference to Examples. However, it should be understood that the present invention is by no means restricted by such Examples.

Examples 1, 2 and 3 are Working Examples of the present invention, and Examples 4 and 5 are Comparative Examples.

EW

EW of polymer (P) was obtained by the following method. Two types of polymers, of which EW is preliminarily known by titration (one having EW of 1,000 g/equivalent and one having EW of 909 g/equivalent), are prepared, and with respect to two types of membranes (thickness: 200 μm) made of the respective polymers, the peak intensity based on a sulfur atom is measured by means of a fluorescent X-ray (RIX3000, manufactured by Rigaku Corporation), whereupon a calibration curve showing the relation between the peak intensity and EW, is prepared. The polymer (P) is pressed at the after-mentioned TQ value temperature to prepare a membrane having a thickness of 200 μm, and its peak intensity based on the sulfur atom is measured by the fluorescent X-ray, and EW is obtained by the above calibration curve. The proportion (molar ratio) of —$SO_2F$ groups in the polymer (P) is the same as the proportion (molar ratio) of —$SO_3H$ groups in the polymer (Q). Accordingly, EW of the polymer (P) may be handled as it is as EW of the polymer (Q).

Molar Ratio of Repeating Units

The molar ratio of repeating units constituting polymer (P) was obtained by melt $^{19}$F-NMR.

TQ Value

TQ value (unit: ° C.) is an index for the molecular weight of a polymer and is a temperature at which the amount of extrusion becomes 100 mm$^3$/sec, when the polymer is subjected to melt-extrusion under an extrusion pressure condition of 2.94 MPa using a nozzle having a length of 1 mm and an inner diameter of 1 mm.

Using flow tester CFT-500A (manufactured by Shimadzu Corporation), the amount of extrusion of polymer (P) was measured by changing the temperature, whereby the TQ value at which the amount of extrusion became 100 mm$^3$/sec. was obtained.

Proton Conductivity

The proton conductivity of a film of polymer (Q) was obtained by the following method.

A substrate having four terminal electrodes disposed at 5 mm intervals, was closely contacted with a film of polymer (Q) having a width of 5 mm, and the resistance of the film was measured by a known four terminal method by applying a voltage of 1 V at a current of 10 kHz under a constant temperature/humidity condition at a temperature of 80° C. under a relative humidity of 50%. From the result, the proton conductivity was calculated. The proton conductivity is an index for the electrical resistance of the polymer electrolyte membrane.

Softening Temperature and Glass Transition Temperature

The softening temperature and glass transition temperature of polymer (Q) were obtained by the following method.

Using a dynamic viscoelasticity measuring apparatus (DVA200, manufactured by ITK Co., Ltd.), the dynamic viscoelasticity of a film of polymer (Q) was measured under such conditions that the sample width was 0.5 cm, clamped distance was 2 cm, the measurement frequency was 1 Hz and the temperature-raising rate was 2° C./min, and a value at which the storage elastic modulus became a half of the value at 50° C. was taken as the softening temperature. Further, from the peak value of tan δ, the glass transition temperature (Tg) was obtained.

Dimensional Change

The dimensional change of the fifth laminate was measured by the following procedure.

Procedure 1: A sample having the electrode portion of the fifth laminate cut out, was placed in an atmosphere at a temperature of 25° C. under a relative humidity of 50% for at least 16 hours, and then, the lengthwise and crosswise lengths were measured at the center portion of the sample, and their average dimension (a) was calculated.

Procedure 2: The sample was immersed in warm water of 80° C. for 3 hours.

Procedure 3: The sample was take out from the warm water, and the lengthwise crosswise lengths were measured at the center portion, and their average dimension (b) was calculated.

Procedure 4: The dimensional change was calculated by the following formula.

Dimensional change (%)=[dimension (b)−dimension (a)]/dimension (a)×100

Peeled Ratio of Electrode Immersed in Warm Water

The peeled ratio of electrode immersed in warm water, of the fifth laminate, was measured by the following procedure.

Procedure 1: The fifth laminate was placed in an atmosphere at a temperature of 25° C. under a relative humidity of 50% for at least 16 hours, and then, the lengthwise crosswise lengths at the center portion of the electrode portion were measured, and the area (a) was calculated.

Procedure 2: The fifth laminate was immersed in warm water of 80° C. for 12 hours.

Procedure 3: The fifth laminate was taken out from the warm water and dried for 12 hours at room temperature, and then, the area (b) of the peeled electrode portion was measured for every 1-cm-square and calculated.

Procedure 4: The peeled ratio was calculated by the following formula.

Peeled ratio (%)=area (*b*)/area (*a*)×100

Cell Voltage

A membrane/electrode assembly was assembled into a cell for power generation, and while the temperature of the membrane/electrode assembly was maintained at 80° C., hydrogen (utilization ratio: 70%) was supplied to the anode, and air (utilization ratio: 50%) was supplied to the cathode, under a pressure of 150 kPa (absolute pressure). The humidification degree of the gas was adjusted to a relative humidity of 100% for both the hydrogen and air, and the cell voltage when the current density was 1.0 A/cm$^2$, was recorded.

Further, the cell voltage when the current density was 1.0 A/cm$^2$ was recorded under the same conditions except that both hydrogen and air were adjusted to have a relative humidity of 0%, and they were supplied under a pressure of 175 kPa (absolute pressure).

Resistance

A membrane/electrode assembly was assembled into a cell for power generation, and the resistance was measured by a current breaker method.

Insulation Resistance

The insulation resistance of a membrane/electrode assembly was measured by the following procedure.

Figure 15:
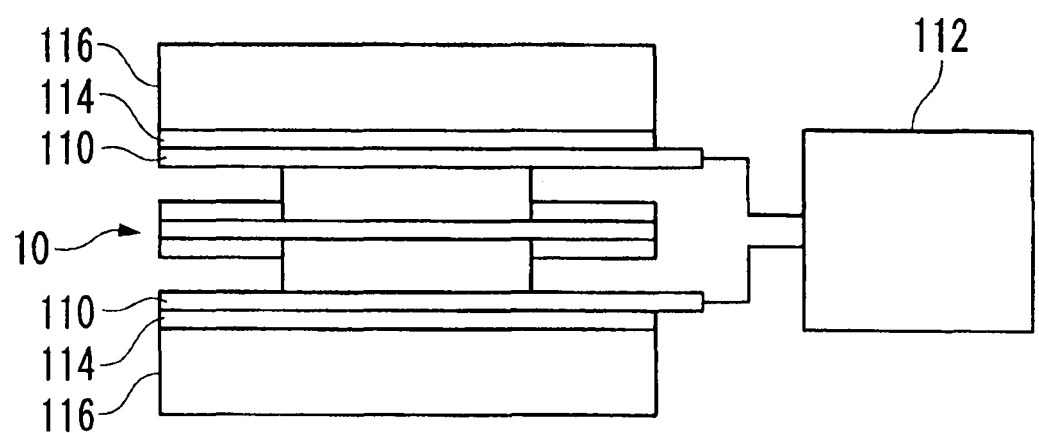
FIG. 15 is a schematic view for illustration of a method for measuring an insulation resistance.

Procedure 1: As shown in FIG. 15, a membrane/electrode assembly 10 is interposed between two sheets of current collectors 110, and a potentiostat 112 (HA-301, manufactured by HOKUTO DENKO CORPORATION) was connected to the current collectors 110.

Procedure 2: A laminate of the current collector 110/the membrane/electrode assembly 10/the current collector 110 was sandwiched by press plates 116 via insulating plates 114, and a pressure of 1 MPa was applied to the electrode portion of the membrane/electrode assembly 10, while applying a voltage of 50 mV to the current collectors 110, and after 5 seconds, the current value was measured.

Procedure 3: The insulation resistance value was calculated by the following formula.

Insulation resistance ($\Omega \cdot cm^2$)=voltage (mV)/(current value (mA)/electrode area ($cm^2$))

The measurement was repeated five times, and a case where the insulation resistance was at least 1,000 ($\Omega \cdot cm^2$), was rated "pass", and the number of such cases was indicated.

Humidifying-Drying Cycle Test

The humidifying-drying cycle test was carried out in accordance with the method disclosed in the following document.

Yeh-Hung Lai, Cortney K. Mittelsteadt, Craig S. Gittleman, David A. Dillard, "VISCOELASTIC STRESS MODEL AND MECHANICAL CHARACTERIZATION OF PERFLUOROSULFONIC ACID (PFSA) POLYMER ELECTROLYTE MEMBRANES", proceedings of FUELCELL2005, Third International Conference on Fuel Cell Science, Engineering and Technology, FUELCELL2005, (2005), 74120.

Specifically, the test was carried out as follows.

A membrane/electrode assembly was assembled into a cell for power generation (electrode area: 25 $cm^2$), and nitrogen was supplied at 1 L/min to the anode and the cathode, respectively, at a cell temperature of 80° C. At that time, the gas was adjusted to a relative humidity of 150% for both the anode and the cathode and supplied for two minutes, and then, the gas was adjusted to a relative humidity of 0% and supplied for two minutes, and this process was taken as one cycle and repeated. After every 100 cycles, a pressure difference was created between the anode and the cathode to judge the presence or absence of physical gas leakage. The point of time when the gas leakage occurred and the gas crossover speed became at least 10 sccm, was judged to be the lifetime. The number of cycles at such a point of time is an index for the durability performance. The number of cycles being less than 20,000 cycles was identified by X, and the number of cycles being at least 20,000 cycles was identified by ○.

PREPARATION EXAMPLES

The compound (m12) was prepared by the following preparation route.

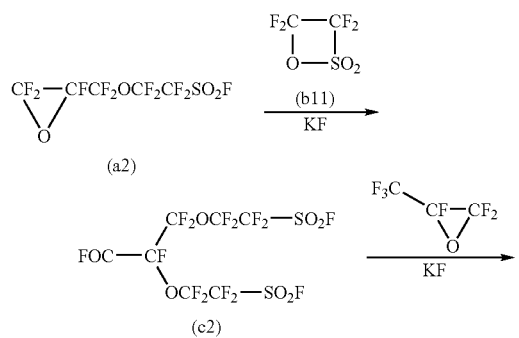

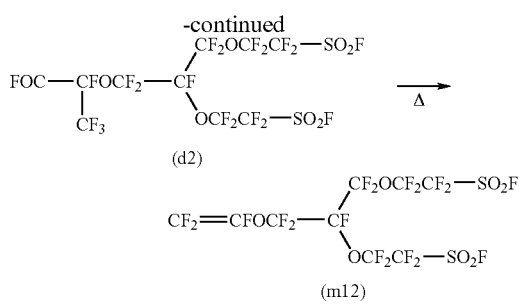

Preparation of Compound (a2)

Compound (a2) was prepared in the same manner as the method disclosed in Example 2 in JP-A-57-176973.

Preparation of Compound (c2)

Into a 300 $cm^3$ four-necked round-bottomed flask equipped with a Dimroth condenser, a thermometer, a dropping funnel and a glass rod provided with stirring vanes, 1.6 g of potassium fluoride (CHLOROCATCH F, manufactured by Morita Chemical Industries Co., Ltd.) and 15.9 g of dimethoxyethane were put in a nitrogen atmosphere. Then, the round-bottomed flask was cooled in an ice bath, and 49.1 g of compound (b11) was dropwise added from the dropping funnel over a period of 32 minutes at an internal temperature of at most 10° C. After completion of the dropwise addition, 82.0 g of compound (a2) was dropwise added from the dropping funnel over a period of 15 minutes. No substantial increase of the internal temperature was observed. After completion of the dropwise addition, the internal temperature was returned to room temperature, and stirring was carried out for about 90 hours. By a separating funnel, the lower layer was recovered. The recovered amount was 127.6 g, and the purity by gas chromatography (hereinafter referred to as GC) was 55%. The recovered liquid was transferred to a 200 $cm^3$ four-necked round-bottomed flask, and distillation was carried out. As a fraction under a reduced pressure of from 1.0 to 1.1 kPa (absolute pressure), 97.7 g of compound (c2) was obtained. The GC purity was 98%, and the yield was 80%.

Preparation of Compound (d2)

Into a 200 $cm^3$ stainless steel autoclave, 1.1 g of potassium fluoride (CHLOROCATCH F, manufactured by Morita Chemical Industries Co., Ltd.) was put. After deaeration, 5.3 g of dimethoxyethane, 5.3 g of acetonitrile and 95.8 g of compound (c2) were put into the autoclave under reduced pressure.

Then, the autoclave was cooled in an ice bath, and 27.2 g of hexafluoropropene oxide was added over a period of 27 minutes at an internal temperature of 0 to 5° C., and then, the internal temperature was returned to room temperature with stirring, followed by stirring overnight. By a separating funnel, the lower layer was recovered. The recovered amount was 121.9 g, and the GC purity was 63%. By distillation of the recovered liquid, 72.0 g of compound (d2) was obtained as a fraction having a boiling point of from 80 to 84° C./0.67 to 0.80 kPa (absolute pressure). The GC purity was 98%, and the yield was 56%.

Preparation of Compound (m12)

Using a stainless steel tube having an inner diameter of 1.6 cm, a U-tube having a length of 40 cm was prepared. In one side of the U-tube, glass wool was packed, and in the other side, glass beads were packed using a stainless steel sintered metal as grating, thereby to prepare a fluidized bed type reactor. Using nitrogen gas as a fluidizing gas, it was made possible to continuously supply the raw material by means of a metering pump. The outlet gas was collected by liquid nitrogen by means of a trap tube.

The fluidized bed type reactor was immersed in a salt bath, and while the reaction temperature was maintained to be 340° C., 34.6 g of compound (d2) was supplied to the fluidized bed type reactor over a period of 1.5 hours so that the molar ratio of compound (d2)/$N_2$ would be 1/20. After completion of the reaction, 27 g of a liquid was obtained from the liquid nitrogen trap. The GC purity was 84%. By distillation of the liquid, compound (m12) was obtained as a fraction having a boiling point of 69° C./0.40 kPa (absolute pressure). The GC purity was 98%.

$^{19}$F-NMR of compound (m12) (282.7 MHz, solvent $CDCl_3$, standard: $CFCl_3$).

δ (ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9 (1F).

Production Example 1

A polymer electrolyte membrane was formed as follows.

Preparation of Polymer (P1)

An autoclave (internal capacity: 2,575 cm$^3$, made of stainless steel) was flushed with nitrogen to carry out deaeration sufficiently. Under reduced pressure, 950.3 g of compound (m12), 291.4 g of compound (m21), 490.1 g of compound (3-1) as a solvent, 173.7 mg of methanol and 873.1 mg of compound (4) (Peroyl IPP, manufactured by NOF Corporation) as a radical initiator, were introduced, and the interior of the autoclave was deaerated to the vapor pressure.

$CClF_2CF_2CHClF$ (3-1), $(CH_3)_2CHOC(=O)OOC(=O)OCH(CH_3)_2$ (4)

The internal temperature was raised to 40° C., and TFE was introduced into the autoclave and the pressure was adjusted to 0.44 MPaG (gauge pressure). While maintaining the temperature and the pressure to be constant, polymerization was carried out for 6.0 hours. Then, the interior of the autoclave was cooled to stop the polymerization, and the gas in the system was purged.

The reaction solution was diluted with compound (3-1), and then compound (3-2) was added to agglomerate the polymer, followed by filtration.

$CH_3CCl_2F$ (3-2)

The polymer was stirred in compound (3-1), and then compound (3-2) was added to recrystallize the polymer, followed by filtration. Such reagglomeration was repeated twice. The polymer was dried under reduced pressure overnight at 80° C. to obtain 203.4 g of polymer (P1) being a copolymer of TFE, compound (m12) and compound (m21). EW, the ratio of repeating units constituting the polymer and the TQ value are shown in Table 1.

TABLE 1

| Obtained precursor polymer | P1 |
|---|---|
| EW (g/equivalent) | 645 |
| Units (TFE) (mol %) | 84.0 |
| Units (M12) (mol %) | 11.2 |
| Units (M21) (mol %) | 4.8 |
| U2/(U1 + U2) (molar ratio) | 0.3 |
| TQ (° C.) | 269 |

Preparation of Polymer (Q1)

Polymer (P1) was added under heating to an aqueous potassium hydroxide solution containing methanol to hydrolyze and convert —$SO_2F$ groups to —$SO_3K$ groups.

The polymer was washed with water and added to an aqueous sulfuric acid solution to convert —$SO_3K$ groups to sulfonic acid groups to obtain acid-form polymer (Q1).

Preparation of Polymer (Q1) Dispersion

Polymer (Q1) was dispersed in a mixed dispersing medium of ethanol/water=1/1 (mass ratio) to obtain a polymer (Q1) dispersion having a solid content concentration of 13 mass %.

Formation of Polymer Electrolyte Membrane

The polymer (Q1) dispersion was applied on the surface of an ETFE film (Aflex 100N, manufactured by Asahi Glass Company, Limited, thickness: 100 μm) by a die coater, dried for 15 minutes in a dryer of 80° C. and further heat-treated for one hour in a dryer of 160° C. to form a film of polymer (Q1) having a thickness of 20 μm (polymer electrolyte membrane).

The softening temperature, glass transition temperature and proton conductivity of the film of polymer (Q1) were measured. The results are shown in Table 2.

TABLE 2

| Precursor polymer used | P1 |
|---|---|
| Acid form polymer obtained | Q1 |
| Softening temperature (° C.) | 97 |
| Tg (tanδ) (° C.) | 127 |
| Proton conductivity (S/cm) | 0.12 |

Production Example 2

A reinforcing layer was formed as follows.

Preparation of Electrically Conductive Coating Fluid

Polymer (H1) (ion-exchange capacity: 1.1 meq/g dry resin) comprising units based on TFE and units (11), was dispersed in ethanol to prepare an ion-exchange resin fluid (A') having a solid content concentration of 10 mass %.

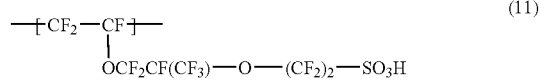
(11)

To 10.0 g of vapor phase-grown carbon fibers (VGCF-H, manufactured by Showa Denko K.K., fiber diameter: about 150 nm, fiber length: 10 to 20 μm), 35.1 g of distilled water was added and thoroughly stirred. 30.0 g of the ion-exchange resin fluid (A') and 54.9 g of ethanol were added thereto and thoroughly stirred, and further, mixed and pulverized by means of an ultrasonic application device to obtain an electrically conductive coating fluid (A) having a solid content concentration of 10 mass %. The mass ratio of the gas phase-grown carbon fibers to polymer (H1) (gas phase-grown carbon fibers/polymer (H1)) in the electrically conductive coating fluid (A) was 1/0.3.

Reinforcing Layer

As a sheet-form reinforcing material, a polypropylene non-woven fabric (weight per unit area: 5 g/m$^2$, average fiber diameter: 2 μm, thickness: 40 μm) was prepared.

The polypropylene non-woven fabric was placed on the surface of an ETFE film (Aflex 100N, manufactured by Asahi Glass Company, Limited, thickness: 100 μm), and the electrically conductive coating fluid (A) was applied on the surface of the polypropylene non-woven fabric by means of a die coater and then dried for 15 minutes in a dryer of 80° C. to obtain a reinforcing layer (R). The applied amount of the electrically conductive coating fluid layer was 1.6 mg/cm$^2$, and the thickness of the reinforcing layer was about 70 μm.

Other Materials

Coating Fluid for Catalyst Layer 10 g of a catalyst (manufactured by Tanaka Kikinzoku Kogyo K.K.) having 50% of platinum supported on a carbon carrier (specific surface area: 800 m$^2$/g) was added to 58.1 g of distilled water, followed by thorough stirring, and further, 58.1 g of ethanol was added, followed by pulverization by means of an ultrasonic application device and thorough stirring. 33.8 g of the polymer (Q1) dispersion was added thereto, followed by thorough stirring to obtain a coating fluid (B) for catalyst layer having a solid content concentration of 9 mass %, a viscosity of 3,200 mPa·s and F/C of 0.95.

Gas Diffusion Layer

As a gas diffusing substrate to constitute a gas diffusion layer, carbon paper (tradename: H2315T10A, manufactured by NOK) having the surface treated for water repellency by a dispersion containing carbon black particles and polytetrafluoroethylene (hereinafter referred to as carbon paper (C)) was prepared.

Subgasket

A subgasket (S) was prepared by punching out a center portion of a PEN film having a thickness of 12 μm in a size of 50 mm square.

Example 1

Step (a')

The coating fluid (B) for catalyst layer was applied on an ETFE film by means of a die coater so that the amount of platinum would be 0.5 mg/cm$^2$, to form a coating fluid layer.

Step (b')

Immediately after the coating fluid layer was formed, the reinforcing layer (R) having the ETFE film removed, was put on the coating fluid layer, and the coating fluid layer was dried for 15 minutes in a dryer of 80° C. and further subjected to heat treatment for 30 minutes in a dryer of 140° C. to form a catalyst layer.

Step (c')

The ETFE film was peeled from the catalyst layer to obtain a first laminate (L11).

Step (d')

The subgasket (S), the first laminate (L11), the polymer electrolyte membrane having the ETFE film removed, the first laminate (L11) and the subgasket (S) were laminated in this order. At that time, lamination was made so that the catalyst layer of the first laminate (L11) was in contact with the polymer electrolyte membrane. Further, lamination was made so that the subgasket (S) was in contact with the peripheral portion of the reinforcing layer of the first laminate (L11) and the peripheral portion of the polymer electrolyte membrane. Such a laminate was put in a press machine preliminarily heated to 150° C. and subjected to hot-pressing for 5 minutes under a pressing pressure of 1.5 MPa to obtain the third laminate (L31) having an electrode area of 25 cm$^2$.

With respect to the third laminate (L31), the dimensional change and the peeled ratio of electrode immersed in warm water were measured. The results are shown in Table 3.

Step (e')

The third laminate (L31) was sandwiched by two sheets of carbon paper (C) and put into a press machine preliminarily heated to 130° C. and subjected to hot pressing for two minutes under a pressing pressure of 1.5 MPa to obtain a membrane/electrode assembly (D1).

With respect to the membrane/electrode assembly (D1), the cell voltage, resistance and insulation resistance were measured. Further, the humidifying-drying cycle test was carried out. The results are shown in Table 3.

Example 2

Step (a')

The coating fluid (B) for catalyst layer was applied on an ETFE film by means of a die coater so that the amount of platinum would be 0.5 mg/cm$^2$, to form a coating fluid layer.

Step (b')

Immediately after the coating fluid layer was formed, the reinforcing layer (R) having the ETFE film removed, was put on the coating fluid layer, and the coating fluid layer was dried for 15 minutes in a dryer of 80° C. and further subjected to heat treatment for 30 minutes in a dryer of 140° C. to form a catalyst layer.

Step (c')

The ETFE film was peeled from the catalyst layer to obtain a first laminate (L11).

Step (a")

The coating fluid (B) for catalyst layer was applied on a polymer electrolyte membrane formed on an ETFE film by means of a die coater so that the amount of platinum would be 0.5 mg/cm$^2$, to form a coating fluid layer.

Step (b")

Immediately after the coating fluid layer was formed, the reinforcing layer (R) having the ETFE film removed, was put on the coating fluid layer, and the coating fluid layer was dried for 15 minutes in a dryer of 80° C. and further subjected to heat treatment for 30 minutes in a dryer of 140° C. to form a catalyst layer.

Step (c")

The ETFE film was peeled from the polymer electrolyte membrane to obtain a second laminate (L22).

Step (d")

A subgasket (S), the first laminate (L12), the second laminate (L22) having an area wider than the first laminate, a subgasket (S) were laminated in this order. At that time, lamination was made so that the catalyst layer of the first laminate (L12) is in contact with the polymer electrolyte membrane of the second laminate (L22). Further, lamination was made so that the lower side subgasket (S) was in contact with the peripheral portion of the reinforcing layer of the first laminate (L12), the peripheral portion of the polymer electrolyte membrane and the upper side subgasket (S). Further, lamination was made so that the upper side subgasket (S) was in contact with the peripheral portion of the reinforcing layer of the second laminate (L22) and the lower side subgasket (S). Such a laminate was put in a press machine preliminarily heated to 150° C. and subjected to hot-pressing for 5 minutes under a pressing pressure of 1.5 MPa to obtain a fifth laminate (L32) having an electrode area of 25 cm².

With respect to the fifth laminate (L32), the dimensional change and the peeled ratio of electrode immersed in warm water were measured. The results are shown in Table 3.

Step (e')

The fifth laminate (L32) was sandwiched by two sheets of carbon paper (C) and put into a press machine preliminarily heated to 130° C. and subjected to hot pressing for two minutes under a pressing pressure of 1.5 MPa to obtain a membrane/electrode assembly (D2).

With respect to the membrane/electrode assembly (D2), the cell voltage, resistance and insulation resistance were measured. Further, the humidifying-drying cycle test was carried out. The results are shown in Table 3.

Example 3

Step (h)

The coating fluid (B) for catalyst layer was applied on an ion-exchange resin membrane having a thickness of 10 μm, formed on an ETFE film, by means of a die coater so that the amount of platinum would be 0.5 mg/cm², to form a coating fluid layer.

Step (i)

Immediately after the coating fluid layer was formed, the reinforcing layer (R) having the ETFE film removed, was put on the coating fluid layer, and the coating fluid layer was dried for 15 minutes in a dryer of 80° C. and further subjected to heat treatment for 30 minutes in a dryer of 140° C. to form a catalyst layer.

Step (j)

The ETFE film was peeled from the ion-exchange resin membrane to obtain a third laminate (L23).

Step (h')

The coating fluid (B) for catalyst layer was applied on an ion-exchange resin membrane having a thickness of 10 μm, formed on an ETFE film, by means of a die coater so that the amount of platinum would be 0.5 mg/cm², to form a coating fluid layer.

Step (i')

Immediately after the coating fluid layer was formed, the reinforcing layer (R) having the ETFE film removed, was put on the coating fluid layer, and the coating fluid layer was dried for 15 minutes in a dryer of 80° C. and further subjected to heat treatment for 30 minutes in a dryer of 140° C. to form a catalyst layer.

Step (j')

The ETFE film was peeled from the ion-exchange resin membrane to obtain a fourth laminate (L23).

Step (k)

A subgasket (S), the third laminate (L23), a subgasket (S), the fourth laminate (L23), a subgasket (S) were laminated in this order. At that time, lamination was made so that the ion-exchange resin membranes of the third laminate (L23) and the fourth laminate (L23) were in contact with each other via the opening of the center subgasket (S) disposed between the third laminate (L23) and the fourth laminate (L23). Further, lamination was made so that the lower side subgasket (S) was in contact with the peripheral portion of the reinforcing layer of the third laminate (L23) and the center subgasket (S). Further, lamination was made so that the upper subgasket (S) was in contact with the peripheral portion of the reinforcing layer of the fourth laminate (L23) and the center subgasket (S). Such a laminate was put in a press machine preliminarily heated to 150° C. and subjected to hot-pressing for 5 minutes under a pressing pressure of 1.5 MPa to form a polymer electrolyte membrane thereby to obtain a fifth laminate (L33) having an electrode area of 25 cm².

With respect to the fifth laminate (L33), the dimensional change and the peeled ratio of electrode immersed in warm water were measured. The results are shown in Table 3.

Step (e')

The fifth laminate (L33) was sandwiched by two sheets of carbon paper (C) and put in a press machine preliminarily heated to 130° C. and subjected to hot pressing for two minutes under a pressing pressure of 1.5 MPa to obtain a membrane/electrode assembly (D3).

With respect to the membrane/electrode assembly (D3), the cell voltage, resistance and insulation resistance were measured. Further, the humidifying-drying cycle test was carried out. The results are shown in Table 3.

Example 4

The coating fluid (B) for catalyst layer was applied on an ETFE film by means of a die coater so that the amount of platinum would be 0.5 mg/cm², and the coating fluid layer was dried for 15 minutes in a dryer of 80° C. and further subjected to heat treatment for 30 minutes in a dryer of 140° C. to form a catalyst layer.

The ETFE film provided with a catalyst layer, a subgasket (S), the polymer electrolyte membrane having the ETFE film removed, a subgasket (S) and the ETFE film provided with a catalyst layer, were laminated in this order. At that time, lamination was made so that the catalyst layer of the ETFE film provided with the catalyst layer was in contact with the polymer electrolyte membrane via the opening of the subgasket (S). Further, lamination was made so that the inner edge portion of the subgasket (S) was interposed between the peripheral portion of the catalyst layer and the peripheral portion of the polymer electrolyte membrane. Such a laminate was put into a press machine preliminarily heated to 150° C. and subjected to hot pressing for 5 minutes under a pressing pressure of 1.5 MPa.

The ETFE film was removed from the catalyst layer to obtain a membrane/catalyst layer assembly (E4) having an electrode area of 25 cm².

With respect to the membrane/catalyst layer assembly (E4), the dimensional change was measured. The results are shown in Table 3.

The membrane/catalyst layer assembly (E4) was sandwiched by two sheets of carbon paper (C) and put into a press machine preliminarily heated to 130° C. and subjected to hot pressing for two minutes under a pressing pressure of 1.5 MPa to obtain a membrane/electrode assembly (D4).

With respect to the membrane/electrode assembly (D4), the cell voltage, resistance and insulation resistance were measured. Further, the humidifying-drying cycle test was carried out. The results are shown in Table 3.

Example 5

The coating fluid (B) for catalyst layer was applied on an ETFE film by means of a die coater so that the amount of platinum would be 0.5 mg/cm², and the coating fluid layer was dried for 15 minutes in a dryer of 80° C. and further subjected to heat treatment for 30 minutes in a dryer of 140° C. to form a catalyst layer thereby to obtain an ETFE film provided with the catalyst layer, of 55 mm square.

The ETFE film provided with the catalyst layer, a subgasket (S), a polymer electrolyte membrane of 70 mm square, having an ETFE film removed, a subgasket (S) and the ETFE film provided with the catalyst layer, were laminated in this order. At that time, lamination was made so that the catalyst layer of the ETFE film provided with the catalyst layer is in contact with the polymer electrolyte membrane via the opening of the subgasket (S). Further, lamination was made so that the inner edge of the subgasket (S) was interposed between the peripheral portion of the catalyst layer and the peripheral portion of the polymer electrolyte membrane. Such a laminate was put into a press machine preliminarily heated to 150° C. and subjected to hot pressing for 5 minutes under a pressing pressure of 1.5 MPa.

The ETFE film was removed from the catalyst layer to obtain a membrane/catalyst layer assembly (E5) having an electrode area of 25 $cm^2$.

The reinforcing layer (R) of 50 mm square having an ETFE film removed, the membrane/catalyst layer assembly (E5) and the reinforcing layer (R) of 50 mm square having an ETFE film removed, were laminated in this order and put into a press machine preliminarily heated to 150° C. and subjected to hot pressing for 5 minutes under a pressing pressure of 1.5 MPa to obtain a fifth laminate (L35).

With respect to the fifth laminate (L35), the dimensional change was measured. The results are shown in Table 3.

The fifth laminate (L35) was sandwiched by two sheets of carbon paper (C) and put into a press machine preliminarily heated to 130° C. and subjected to hot pressing for two minutes under a pressing pressure of 1.5 MPa to obtain a membrane/electrode assembly (D5).

With respect to the membrane/electrode assembly (D5), the cell voltage, resistance and insulation resistance were measured. Further, the humidifying-drying cycle test was carried out. The results are shown in Table 3.

TABLE 3

| | Dimensional change (%) | Peeled ratio of electrode immersed in warm water (%) | Cell voltage (V) | | Resistance ($m\Omega cm^2$) | | Insulation resistance pass ratio | Humidifying-drying cycle test |
| --- | --- | --- | --- | --- | --- | --- | --- | --- |
| | | | RH 100% 150 kPa | RH 0% 175 kPa | RH 100% 150 kPa | RH 0% 175 kPa | | |
| Ex. 1 | 2.1 | 0 | 701 | 656 | 43.7 | 58.1 | 5/5 | ○ |
| Ex. 2 | 2.3 | 0 | 706 | 642 | 41.6 | 63.6 | 5/5 | ○ |
| Ex. 3 | 1.5 | 0 | 707 | 649 | 41.4 | 61.1 | 5/5 | ○ |
| Ex. 4 | 17.4 | — | 687 | 635 | 50 | 76 | 1/5 | X |
| Ex. 5 | Reinforcing layer peeled | — | 671 | 611 | 52.3 | 77.6 | 5/5 | X |

Industrial Applicability

The membrane/electrode assembly of the present invention is useful as a membrane/electrode assembly for a polymer electrolyte fuel cell which is operated under a low humidity condition or in an environment where humidifying and drying, etc. are repeated.

The entire disclosure of Japanese Patent Application No. 2008-152132 filed on Jun. 10, 2008 including specification, claims, drawings and summary is incorporated herein by reference in its entirety.

What is claimed is:

1. A process for forming a catalyst layer in an electrode for a polymer electrolyte fuel cell having said catalyst layer comprising a catalyst and an ion-exchange resin, and a reinforcing layer comprising a porous sheet-form reinforcing material made of a polymer and electrically conductive fibers, which comprises:
   (a) applying a coating fluid comprising a catalyst and an ion-exchange resin, on a substrate to form a coating fluid layer, and
   (b) disposing said reinforcing layer on said coating fluid layer formed in the step (a) and then drying said coating fluid layer to form a catalyst layer.

2. The process of claim 1, wherein said reinforcing layer is electrically conductive and allows for gas diffusion.

3. The process of claim 1, wherein said catalyst comprises platinum.

4. The process of claim 1, wherein said ion-exchange resin is a fluorinated ion-exchange resin.

5. The process of claim 1, wherein said porous sheet-form reinforcing material has a thickness of from 5 to 300 μm.

6. The process of claim 1, wherein said porous sheet-form reinforcing material has a thickness of from 10 to 80 μm.

7. The process of claim 1, wherein said electrically conductive fibers are carbon fibers having an average fiber diameter of 50 to 500 nm.

8. The process of claim 1, wherein said electrically conductive fibers are carbon fibers having an average fiber diameter of 1 to 50 μm.

9. The process of claim 1, wherein said coating fluid has a solid content of 5 to 25 mass %.

10. The process of claim 1, wherein said coating fluid has a solid content of 8 to 15 mass %.

11. The process of claim 1, wherein said coating fluid has a viscosity of 200 to 8,000 mPa·s.

12. The process of claim 1, wherein said coating fluid has a viscosity of 1,000 to 4,000 mPa·s.

13. The process of claim 1, wherein drying is conducted at a temperature of from 50 to 150° C.

14. The process of claim 1, wherein said reinforcing layer is disposed immediately after applying said coating fluid to said substrate.

15. The process of claim 1, wherein said reinforcing layer is disposed within five minutes after applying said coating fluid to said substrate.

16. A process for producing a membrane/electrode assembly for a polymer electrolyte fuel cell, comprising a first electrode having a first catalyst layer, a second electrode having a second catalyst layer and a polymer electrolyte membrane interposed between said first and second catalyst layers, wherein at least said first electrode further comprises a reinforcing layer comprising a porous sheet-form reinforcing material made of a polymer and electrically conductive fibers, which comprises:
   (a') applying a coating fluid comprising a catalyst and an ion-exchange resin, on a release film to form a coating fluid layer,
   (b') disposing said reinforcing layer on said coating fluid layer formed in step (a') and then drying said coating fluid layer to form a first catalyst layer,
   (c') removing said release film from said first catalyst layer formed in step (b') to obtain a first laminate comprising said first catalyst layer and said reinforcing layer, and (d') bonding said first laminate obtained in step (c') with a polymer electrolyte membrane so that said first catalyst layer of said first laminate is in contact with said polymer electrolyte membrane.

17. A process for producing a membrane/electrode assembly for a polymer electrolyte fuel cell, comprising a first electrode having a first catalyst layer, a second electrode having a second catalyst layer and a polymer electrolyte membrane interposed between the first and second catalyst layers, wherein at least said second electrode further comprises a reinforcing layer comprising a porous sheet-form reinforcing material made of a polymer and electrically conductive fibers, which comprises:

(a") applying a coating fluid comprising a catalyst and an ion-exchange resin, on a polymer electrolyte membrane formed on a release film, to form a coating fluid layer, (b") disposing said reinforcing layer on said coating fluid layer formed in step (a") and then drying said coating fluid layer to form a second catalyst layer, (c") removing said release film from said polymer electrolyte membrane after step (b") to obtain a second laminate comprising said polymer electrolyte membrane, said second catalyst layer and said reinforcing layer.

18. The process for producing a membrane/electrode assembly for a polymer electrolyte fuel cell according to claim 17, which further comprises:

(a') applying a coating fluid comprising a catalyst and an ion-exchange resin, on a release film to form a coating fluid layer, (b') disposing a reinforcing layer comprising a porous sheet-form reinforcing material made of a polymer and electrically conductive fibers on said coating fluid layer formed in step (a') and then drying said coating fluid layer to form a first catalyst layer, (c') removing said release film from said first catalyst layer formed in step (b') to obtain a first laminate comprising said first catalyst layer and said reinforcing layer, and (d") bonding said first laminate obtained in step (c') with said second laminate obtained in step (c") so that said first catalyst layer of said first laminate is in contact with said polymer electrolyte membrane of said second laminate.

19. A process for producing a membrane/electrode assembly for a polymer electrolyte fuel cell, comprising a first electrode having a first catalyst layer, a second electrode having a second catalyst layer and a polymer electrolyte membrane interposed between the first and second catalyst layers, wherein each of said first electrode and said second electrode further comprises a reinforcing layer comprising a porous sheet-form reinforcing material made of a polymer and electrically conductive fibers, which comprises:

(h) applying a coating fluid comprising a catalyst and an ion-exchange resin, on a first ion exchange resin membrane formed on a release film, to form a coating fluid layer, (i) disposing a first reinforcing layer comprising a porous sheet-form reinforcing material made of a polymer and electrically conductive fibers on said coating fluid layer formed in step (h) and then drying said coating fluid layer to form a first catalyst layer, (j) removing said release film from said first ion exchange membrane after step (i) to obtain a third laminate comprising said first ion-exchange resin membrane, said first catalyst layer and said first reinforcing layer, (h') applying a coating fluid comprising a catalyst and an ion-exchange resin, on a second ion exchange resin membrane formed on a release film, to form a coating fluid layer, (I') disposing a second reinforcing layer comprising a porous sheet-form reinforcing material made of a polymer and electrically conductive fibers on said coating fluid layer formed in step (h') and then drying said coating fluid layer to form a second catalyst layer, (j') removing said release film from said second ion exchange membrane after step (I') to obtain a fourth laminate comprising said second ion-exchange resin membrane, said second catalyst layer and said second reinforcing layer, and (k) bonding said third laminate obtained in the step (j) with said fourth laminate obtained in step (j') so that said first ion-exchange resin membrane of said third laminate is in contact with said second ion-exchange resin membrane of said fourth laminate thereby to form a polymer electrolyte membrane comprising said first ion-exchange resin membrane and said second ion-exchange resin membrane.

* * * * *